(12) United States Patent
Nakayama et al.

(10) Patent No.: US 8,987,344 B2
(45) Date of Patent: Mar. 24, 2015

(54) HARDCOAT COMPOSITION

(75) Inventors: Norio Nakayama, Chiba (JP);
Toshihiko Takaki, Chiba (JP); Chaobin He, Research Link (SG); Khine Yi Mya, Research Link (SG); Yang Xiao, Research Link (SG)

(73) Assignees: Mitsui Chemicals, Inc., Tokyo (JP);
Agency for Science, Technology and Research, Connexis (SG)

( * ) Notice: Subject to any disclaimer, the term of this patent is extended or adjusted under 35 U.S.C. 154(b) by 511 days.

(21) Appl. No.: 12/523,268

(22) PCT Filed: Jan. 16, 2007

(86) PCT No.: PCT/JP2007/050863
§ 371 (c)(1),
(2), (4) Date: Jul. 15, 2009

(87) PCT Pub. No.: WO2008/087741
PCT Pub. Date: Jul. 24, 2008

(65) Prior Publication Data
US 2010/0029804 A1    Feb. 4, 2010

(51) Int. Cl.
| | | |
|---|---|---|
| C08F 2/42 | (2006.01) |
| C03C 25/10 | (2006.01) |
| C03C 25/40 | (2006.01) |
| C03C 25/50 | (2006.01) |
| C03C 17/30 | (2006.01) |
| C08F 283/12 | (2006.01) |
| C09D 183/06 | (2006.01) |
| C08G 18/38 | (2006.01) |
| C08G 18/76 | (2006.01) |
| C08K 5/5435 | (2006.01) |
| C08L 63/00 | (2006.01) |
| C08L 83/02 | (2006.01) |

(52) U.S. Cl.
CPC .......... *C09D 183/06* (2013.01); *C08G 18/3876* (2013.01); *C08G 18/7642* (2013.01); *C08K 5/5435* (2013.01); *C08L 63/00* (2013.01); *C08L 83/02* (2013.01)
USPC ............. 522/172; 522/148; 522/99; 522/178; 522/181; 522/170; 528/27; 528/40; 264/1.1; 264/1.32; 264/1.38; 264/1.7

(58) Field of Classification Search
USPC ........... 522/99, 148, 170, 168, 172, 178, 181; 528/27, 40, 10, 25; 428/413, 419, 428/423.1, 425.5, 426, 429, 428, 446, 448, 428/447, 543; 264/1.1, 1.32, 1.38, 1.7
See application file for complete search history.

(56) References Cited

U.S. PATENT DOCUMENTS

| | | | |
|---|---|---|---|
| 6,121,342 A | 9/2000 | Suzuki et al. | |
| 6,187,844 B1 * | 2/2001 | Murata | 524/91 |
| 6,235,807 B1 * | 5/2001 | Misev | 522/15 |
| 6,770,692 B1 * | 8/2004 | Kobayashi et al. | 524/91 |

FOREIGN PATENT DOCUMENTS

| | | |
|---|---|---|
| JP | 9-110956 A | 4/1997 |
| JP | 11-29640 A | 2/1999 |
| JP | 11-116682 A | 4/1999 |
| JP | 2002-194083 A | 7/2002 |
| JP | 2005-89697 A | 4/2005 |
| JP | 2006-193693 A | 7/2006 |
| JP | 2006-199957 A | 8/2006 |
| JP | 2007-9079 A | 1/2007 |
| JP | 2007-9080 A | 1/2007 |

OTHER PUBLICATIONS

Extended Search Report from European Patent Office issued in Applicant's corresponding European Patent Application No. 07713667.9 dated Jul. 14, 2010.
International Search Report (PCT/ISA/210) for PCT/JP2007/050863 completed Apr. 3, 2007.

* cited by examiner

*Primary Examiner* — Sanza McClendon
(74) *Attorney, Agent, or Firm* — Buchanan, Ingersoll & Rooney PC

(57) ABSTRACT

A hard coating composition including at least the following components (A) to (E): Component (A): A poly(methyl)glycidyl ether compound derived from a chain aliphatic polyol or a chain aliphatic polyether polyol, which may or may not contain a hydroxyl group, Component (B): A silsesquioxane compound containing a cationic polymerizable group, Component (C): A silicate compound, Component (D): A silane compound containing a cationic polymerizable group, or a partial condensed compound thereof, or a mixture thereof, and Component (E): A cationic photopolymerization initiator, wherein the composition includes 5 to 40 parts by weight of the component (A), 60 to 95 parts by weight of the total of the components (B), (C) and (D), and 0.1 to 10 parts by weight of the component (E), each based on 100 parts by weight of the total of the components (A) to (D).

11 Claims, 4 Drawing Sheets

HARDCOAT COMPOSITION

TECHNICAL FIELD

The present invention relates to a hardcoat composition comprising at least a poly(methyl)glycidyl ether compound, a cationic polymerizable group-containing silsesquioxane compound, a silicate compound, a silane compound and/or a partial condensed compound thereof, and a cationic photopolymerization initiator, which composition has high adhesion to thiourethane resins or resins obtained by thermal ring-opening polymerization of thioepoxy compounds, high surface hardness and scratch resistance, excellent weather resistance. The present invention also relates to a hardcoat composition which contains substantially no solvent for dilution.

BACKGROUND ART

Lenses made of resin have rapidly come into wide use as lens resins, for example, spectacle lenses, camera lenses, pickup lenses used in optical recording and regenerating devices, and the like, in replacement of glass lenses, from the viewpoints of light weight, impact resistance, colorability and the like. For this purpose, products of radical polymerization of diethylene glycol bis(allyl carbonate) (hereinafter, abbreviated to D.A.C.), polycarbonate (PC), polymethyl methacrylate (PMMA) and the like have been conventionally used heretofore. However, because these resins for lenses have refractive indexes $n_d$ of about 1.49 to 1.58, in order to obtain optical properties equivalent to those of glass lenses, it is necessary to increase the center thickness, edge thickness and curvature of a lens. Thus, the lens becomes very thick in overall. Therefore, there has been a demand for a resin having a higher refractive index.

As a solution for such problems, Patent Document 1 describes a resin obtained by thermal polymerization of a thiol compound and an isocyanate compound to form a thiourethane bond, and this resin has a refractive index $n_d$ of about 1.60 to 1.67.

Furthermore, Patent Document 2 describes a resin obtained by thermal ring-opening polymerization of a thioepoxy compound to form an epithiosulfide bond, and this resin has a refractive index $n_d$ of 1.70 or higher.

Meanwhile, although the lenses made of resins have advantages as described above, they are highly inferior to glass lenses in surface hardness and scratch resistance. Thus, as one of measures to handle the problem, it has been essential to perform a hard coating treatment to prevent any scratch from forming on the surface of a lens. As a method of such hard coating treatments, many methods of curing a composition including a polyfunctional (meth)acrylate monomer or oligomer and a radical photopolymerization initiator with ultraviolet ray have been investigated, and various hard coating agents for PC and PMMA have been developed and are widely used for industrial purposes.

However, there still remain the following problems.

[1] A hard coating agent including a polyfunctional (meth)acrylate monomer or oligomer having a functionality of 3 or higher as the main component, has good hard coatability because a cured film formed from the hard coating agent has a high crosslinking density. However, the film formed from the hard coating agent undergoes large shrinkage after curing, and has high residual strain or residual stress. Thus, the hard coating agent may not have sufficient adhesion depending on the resin on which the hard coating agent is applied. Particularly, in the case of the above-described thiourethane resin and thioepoxy resin, it is known to be difficult to obtain sufficient adhesion.

[2] From the viewpoint of the recent attempts to reduce the burden on the environment as much as possible, in order to reduce the use of volatile solvents and to enable the recovery and recycling of liquids to reduce waste materials, there will be a demand in the future for a hard coating agent which does not contain any diluting solvents. But, since polyfunctional (meth)acrylate monomers and oligomers having a functionality of 3 or higher generally have high viscosities, diluting solvents are needed. To decrease the viscosity without using any diluting solvent, a method of using a monofunctional (meth)acrylate monomer having a functionality of 2 or lower as a reactive diluent can be used. However, the hard coating agent using the monomer often does not undergo complete curing, since the agent is likely to be inhibited from polymerizing by oxygen. Even though curing occurs, because the crosslinking density decreases almost proportionally to the amount of the monofunctional monomer, there is a problem that high hard coatability cannot be obtained.

Thus, a method of performing cationic polymerization induced by light is being investigated. Cationic photopolymerization is advantageous over radical photopolymerization, in the points of not being affected by the inhibition of polymerization by oxygen, and having relatively excellent adhesion due to the small shrinkage of the produced film during curing when an epoxy compound or an oxetane compound is used as the monomer. However, under the current circumstances, sufficient hard coatability cannot be obtained.

In addition, Patent Document 3 describes a composition including a cationic photopolymerizable silsesquioxane compound (a), a photocationic compound (b) other than (a), and a cationic photopolymerization initiator (c). Specific examples of the photocationic compound (b) include ethyl vinyl ether and the like as those having a vinyloxy group; bisphenol F diglycidyl ether and the like as those having an epoxy group; and 1,4-bis[(3-ethyl-3-oxetanylmethoxy)methyl]benzene and the like as those having an oxetanyl group. Such a composition tends to have a decreased curing rate, when the proportion of the cationic photopolymerizable silsesquioxane (a) is increased to impart hard coatability. Thus, the composition cannot have sufficient hard coatability, and cannot have adhesion to thiourethane resins or thioepoxy resins. Moreover, the cationic photopolymerizable silsesquioxane (a) generally has a high viscosity even in a liquid phase, and consequently, the composition has an increased viscosity, resulting in deteriorating smoothness as a film.

Even if a hard coating agent which addresses the above-described problems could be obtained, the thiourethane resins and thioepoxy resins used as the substrate are in general known to have poor weather resistance. Thus, the substrates themselves may undergo cohesive failure under exposure to sunlight or rain, and as a result, there still remains a problem of deterioration in the adhesion of the hardcoat formed from the hard coating agent.

Patent Document 1: Japanese Laid-open patent publication No. 9-110956

Patent Document 2: Japanese Laid-open patent publication No. 2002-194083

Patent Document 3: Japanese Laid-open patent publication No. 11-116682

DISCLOSURE OF THE INVENTION

It is an object of the present invention to provide a hard coating agent which has high adhesion to a thiourethane resin or a resin obtained by thermal ring-opening polymerization of a thioepoxy compound, high surface hardness and scratch resistance. High smoothness containing no or substantially no diluting solvents, and a high curing rate and excellent weather resistance are also achieved.

The inventors of the present invention have devotedly conducted investigation to solve the above-described problems. They found that a hardcoat composition including at least a poly(methyl)glycidyl ether compound, a silsesquioxane compound containing a cationic polymerizable group, a silicate compound, a silane compound or a partial condensed compound thereof or a mixture of such compounds, and a cationic photopolymerization initiator, and which are mixed at specific compositional ratios, can be applied on a resin, because the viscosity of the composition can be adjusted to a specific value even though the composition contains substantially no solvent for dilution; has high adhesion to a thiourethane resin or a resin obtained by thermal ring-opening polymerization of a thioepoxy compound; has high surface hardness and scratch resistance, and has high weather resistance. It was also found that in the case of the composition including a specific ultraviolet absorber, the composition has even higher weather resistance.

Thus, the invention relates to the following:

[1] A hardcoat composition including at least the following components (A) to (E):

Component (A): a poly(methyl)glycidyl ether compound represented by Formula (1):

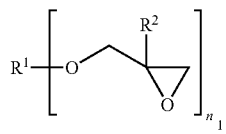

wherein $R^1$ is a chain aliphatic residue or a chain aliphatic polyether residue which may contain a hydroxyl group; $R^2$ is hydrogen or a methyl group; and $n_1$ represents an integer of 2 or larger;

Component (B): a silsesquioxane compound containing a cationic polymerizable group;

Component (C): a silicate compound represented by Formula (2)

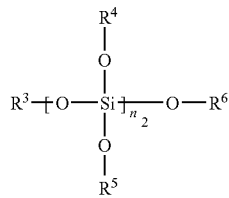

wherein $R^3$ to $R^6$ are each independently an organic group having a cationic polymerizable group, hydrogen or an alkyl group; and $n_2$ represents an integer from 2 to 10;

Component (D): a silane compound represented by Formula (3) or a partial condensed compound thereof, or a mixture of such compounds:

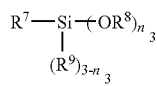

wherein $R^7$ is an organic group having a cationic polymerizable group; $R^8$ and $R^9$ are each independently hydrogen or an alkyl group; and $n_3$ represents an integer from 1 to 3; and Compound (E): a cationic photopolymerization initiator, wherein the composition comprises 5 to 40 parts by weight of the component (A), 60 to 95parts by weight of the total of the components (B), (C), and (D), and 0.1 to 10 parts by weight of the component (E), each based on 100 parts by weight of the total of the components (A) to (D).

[2] The hardcoat composition according to [1], further comprising at least one ultraviolet absorber as component (F), wherein the content of the component (F) is 0.1 to 10 parts by weight based on 100 parts by weight of the components (A) to (D).

[3] The hardcoat composition according to [1] or [2], wherein the component (B) includes a closed type cage-shaped-like silsesquioxane represented by Formula (4) or a partially open type cage-shaped-like silsesquioxane represented by Formula (5), each having at least one cationic polymerizable group:

(i) Closed type cage-shaped-like silsesquioxane:

(ii) Partially open type cage-shaped-like silsesquioxane:

(wherein n represents an integer from 6 to 18; m represents 0 to 3; and $R^{10}$ to $R^{12}$ each represent a cationic polymerizable group, hydrogen, an alkyl group, or a cyclopentyl group).

[4] The hardcoat composition according to any of [1] to [3], wherein the component (B) includes a closed type cage-shaped-like silsesquioxane represented by Formula (6) or a partially open type cage-shaped-like silsesquioxane represented by Formula (7), each having at least one cationic polymerizable group:

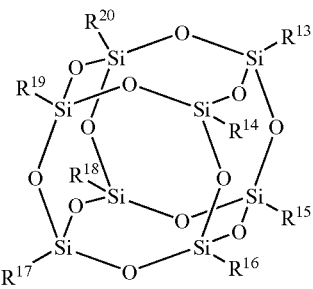

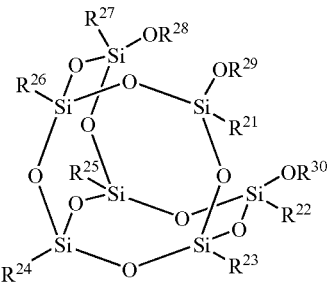

wherein $R^{13}$ to $R^{30}$ each independently represent a cationic polymerizable group, hydrogen, an alkyl group, a cyclopentyl group, or a cyclohexyl group.

[5] The hardcoat composition according to any of [2] to [4], which includes at least one or more ultraviolet absorber having a maximum absorption wavelength of 320 to 400 nm (UV-A), as the Component (F).

[6] The hardcoat composition according to [5], wherein the ultraviolet absorber having a maximum absorption wavelength at 320 to 400 nm (UV-A) is a 2-hydroxybenzophenone-based ultraviolet absorber represented by Formula (8):

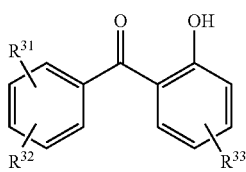

(8)

wherein $R^{31}$ to $R^{33}$ each independently represent a hydroxyl group, a hydrogen atom, an alkyl group or an alkoxy group.

[7] The hardcoat composition according to [5], which includes at least one or more of a triazine-based ultraviolet absorber and/or a benzotriazole-based ultraviolet absorber as the ultraviolet absorber having a maximum absorption wavelength of 320 to 400 nm (UV-A).

[8] The hardcoat composition according to [5], which includes at least a 2-hydroxybenzophenone-based ultraviolet absorber in combination with a triazine-based ultraviolet absorber and/or a benzotriazole-based ultraviolet absorber, as the ultraviolet absorber having a maximum absorption wavelength of 320 to 400 nm (UV-A).

[9] The hardcoat composition according to any of [1] to [8], which further includes a compound having a dimethylsiloxane skeleton represented by Formula (9) as component (G), in an amount of 10.0 parts by weight or less based on 100 parts by weight of the total of (A) to (D)

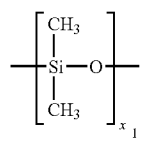

(9)

wherein $x_1$ represents an integer from 1 to 10,000.

[10] The hardcoat composition according to [9], wherein the compound having a dimethylsiloxane skeleton is a polyether-modified polydimethylsiloxane represented by Formula (10) or silsesquioxane bonded to the main chain or side chain of dimethylsiloxane:

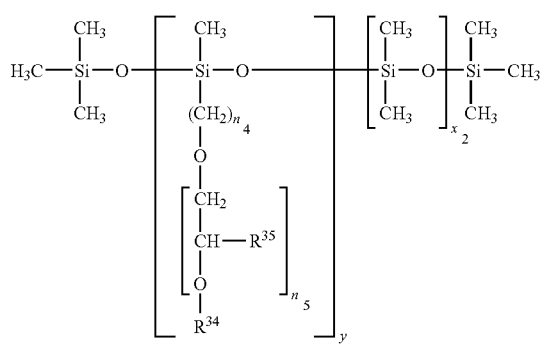

(10)

wherein $R^{35}$ represents a hydrogen atom or an alkyl group having 1 to 4 carbon atoms; $R^{34}$ represents a hydrogen atom, an alkyl group having 1 to 4 carbon atoms, a cationic polymerizable group, or an ethylenic unsaturated group; $n_4$ and $n_5$ are each an integer from 1 to 5; $x_2$ is an integer from 1 to 70; $y$ is an integer from 1 to 30; and $y/x_2$ is 1 or less.

[11] The hardcoat composition according to any of [1] to [10], which further includes silica nanoparticles as component (H), in an amount of 10.0 parts by weight or less based on 100 parts by weight of the total of components (A) to (D).

[12] The hardcoat composition according to any of [1] to [11], wherein the viscosity of the composition measured by a Type E viscometer at 25° C. is 1 to 500 mPa·s.

[13] A molded article having a cured film formed by applying the hardcoat composition according to any of [1] to [12] on the surface of the molded article, and then curing the composition.

[14] The molded article according to [13], wherein the molded article is formed of at least one selected from a thiourethane resin or a thioepoxy resin.

[15] lens having a cured coating film which is formed by applying the hardcoat composition according to any of [1] to [12] on the surface of the lens, and then curing the composition.

The hardcoat composition of the invention is an ultraviolet-curable hard coating agent which can be used for a thiourethane-based resin obtained by thermal polymerization of a polythiol compound and a polyisocyanate compound (hereinafter, referred to as a thiourethane resin) or a resin obtained by thermal ring-opening polymerization of a thioepoxy compound (hereinafter, referred to as a thioepoxy resin), and is advantageous in that the composition has high curability and excellent adhesion, scratch resistance and weather resistance, has substantially no volatile components since the composition contain substantially no diluting solvent, and exerts less burden on the environment since the composition can be recovered and recycled.

BEST MODE FOR CARRYING OUT THE INVENTION

Figure 1:
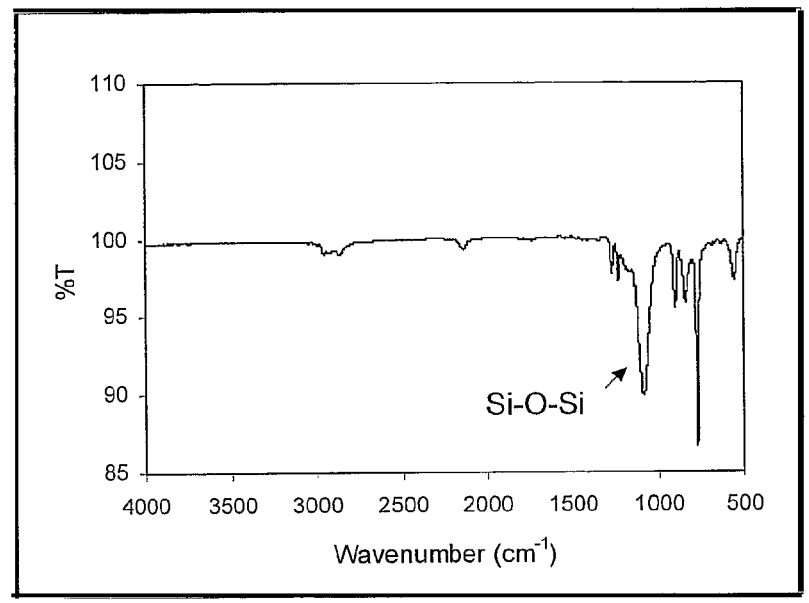
FIG. 1 shows the FTIR measurement results of octa[2-(butoxymethyl)oxirane-dimethylsiloxy]-silsesquioxane.

Hereinafter, the present invention will be illustrated in detail.

The invention relates to a hardcoat composition including at least the following components (A) to (E):

Component (A): a poly(methyl)glycidyl ether compound represented by the Formula (1);

Component (B): a silsesquioxane compound containing a cationic polymerizable group;

Component (C): a silicate compound represented by the Formula (2);

Component (D): a silane compound represented by the Formula (3) or a partial condensed compound thereof, or a mixture of such compounds; and Component (E): a cationic photopolymerization initiator, wherein the composition includes 5 to 40 parts by weight of the component (A), 60 to 95 parts by weight of the total of the components (B), (C) and (D), and 0.1 to 10 parts by weight of the component (E), each based on 100 parts by weight of the total of the components (A) to (D).

Furthermore, a hardcoat composition in the present invention may further comprise at least one ultraviolet absorber as component (F), in an amount of 0.1 to 10 parts by weight based on 100 parts by weight of the total of (A) to (D).

The component (A) of the invention refers to the poly(methyl)glycidyl ether compound represented by the Formula (1):

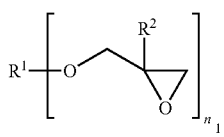

(1)

wherein $R^1$ is a chain aliphatic residue or a chain aliphatic polyether residue which may contain a hydroxyl group; $R^2$ is hydrogen or a methyl group; and $n_1$ represents an integer of 2 or larger.

According to the invention, the component (A) is preferably a poly(methyl)glycidyl ether compound which may contain a hydroxyl group, which compound is derived from a chain aliphatic polyol or a chain aliphatic polyether polyol. The component (A) is a compound having at least two or more of (methyl)glycidyl ether groups, and can be prepared by various methods. A method of performing condensation by dehydrochlorination of a chain aliphatic polyol or a chain aliphatic polyether polyol having at least two or more of hydroxyl groups, represented by Formulas (11) to (17), and (methyl) epichlorohydrin represented by Formula (18), in the presence of a basic compound, is generally used.

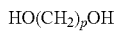

(11)

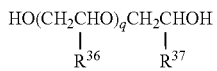

(12)

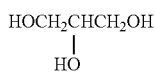

(13)

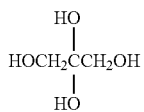

(14)

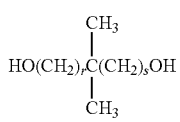

(15)

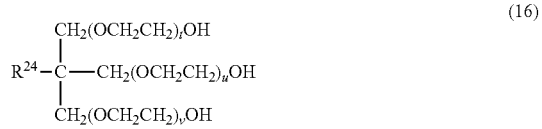

(16)

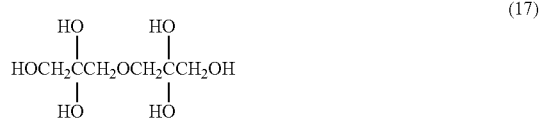

(17)

wherein p is an integer from 1 to 10; q is an integer from 0 to 10; r and s are each independently an integer from 0 to 10; t, u and v are each independently an integer from 0 or 1 to 10; and $R^{36}$ and $R^{37}$ each independently represent hydrogen or an alkyl group having 1 to 4 carbon atoms.

For the definition above, the alkyl group having 1 to 4 carbon atoms may be specifically exemplified by a methyl group, an ethyl group, a butyl group, an n- and i-propyl group, an n-, i- and t-butyl group, or the like.

(18)

wherein $R^2$ represents hydrogen or a methyl group.

The compound represented by the Formula (1) of the invention may be specifically exemplified by the following compounds.

As the compound having two (methyl)glycidyl ether groups, ethylene glycol(methyl)diglycidyl ether, triethylene glycol di(methyl)glycidyl ether, tetraethylene glycol di(methyl)glycidyl ether, polyethylene glycol di(methyl)glycidyl ether, glycerin di(methyl)glycidyl ether, 1,4-butanediol di(methyl)glycidyl ether, 1,6-hexanediol di(methyl)glycidyl ether, neopentyl glycol(methyl)glycidyl ether and the like may be mentioned.

Furthermore, as the compound having three or more glycidyloxy groups, glycerin tri(methyl)glycidyl ether, trimethylolpropane tri(methyl)glycidyl ether, pentaerythritol tri(methyl)glycidyl ether, pentaerythritol tetra(methyl)glycidyl ether, dipentaerythritol hexa(methyl)glycidyl ether, dipentaerylthritol penta(methyl)glycidyl ether, dipentaerythritol tetra(methyl)glycidyl ether, carbitol polyglycidyl ether and the like may be mentioned.

A compound containing a group other than the chain aliphatic residue or the chain aliphatic polyether residue, specifically for example, an aromatic residue, a chain aliphatic polyester residue, an alicyclic aliphatic residue or the like, has insufficient hard coatability. A compound containing a cationic polymerizable group other than the (methyl)glycidyl ether group, specifically for example, an alicyclic epoxy group or an oxetanyl group, tends to have insufficient adhesion to a thiourethane resin or a thioepoxy resin. A compound having only one (methyl)glycidyl ether group in the structure has insufficient curing rate or hard coatability. A compound having a hydroxyl group in the structure would be acceptable if the compound contains two or more (methyl)glycidyl ether groups, and there would be no adverse effect on the curing rate, hard coatability and adhesion.

These compounds are used individually or in combination of two or more species.

The silsesquioxane compound containing a cationic polymerizable group as the component (B) according to the invention will be described. According to the invention, any silsesquioxane compound containing a cationic polymerizable group may be used, and there is no particular limitation thereon. (The cationic polymerizable group will be described later).

A silsesquioxane compound is a silane compound having a fundamental skeleton of Formula (19), which is obtained by hydrolyzing a trifunctional silane such as alkoxysilane, chlorosilane, silanol or the like. The compound is known to have an irregular form called random structure, as well as a ladder form, a cage structure (completely fused cage structure) or a partially open structure (a structure missing a portion of the silicon atoms from the cage structure, or a structure having a part of the silicon-oxygen bonds in the cage structure cleaved), and the like.

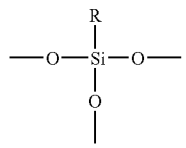

(19)

wherein R represents an organic group.

Among those, the silsesquioxane referred to as the cage-shaped structure has excellent hard coatability, and it is preferable that this cage structure silsesquioxane is included in the silsesquioxane. This structure is represented by, for example, (i) a closed type cage-shaped-like silsesquioxane:

(4)

(ii) a partially open type cage-shaped-like silsesquioxane:

(5)

wherein n represents an integer from 6 to 18; m represents 0 to 3; and $R^{10}$ to $R^{12}$ each represent a cationic polymerizable group, hydrogen, an alkyl group, a cyclopentyl group, or a cyclohexyl group.

(i) The value of n in the silsesquioxane of a closed type cage-shaped-like structure represented by Formula (4) is an even number of from 6 to 18, preferably from 6 to 14, more preferably 8, 10 or 12, and even more preferably 8, or a mixture of 8, 10 and 12.

For example, it is known that (i-1): when n is 6, the silsesquioxane has a triangular prismatic structure; (i-2): when n is 8, the silsesquioxane has a hexahedral structure; (i-3): when n is 10, the silsesquioxane has a pentagonal prismatic structure; (i-4): when n is 12, the silsesquioxane has an octahedral structure; and (i-5): when n is 14, the silsesquioxane has an enneahedral structure (they are represented by Formulas (20) to (24)).

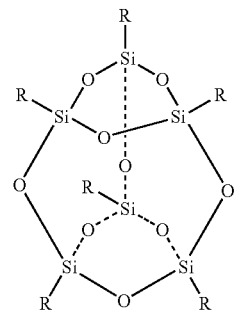

(20)

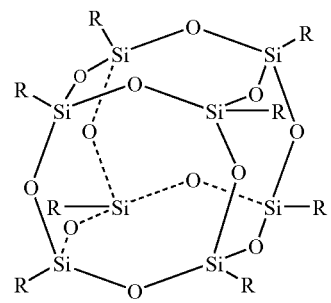

(21)

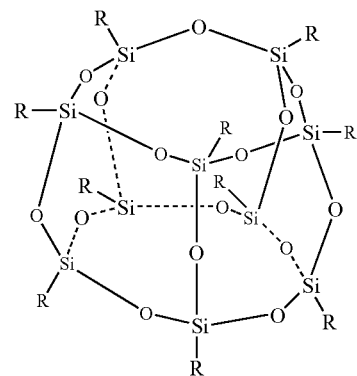

(22)

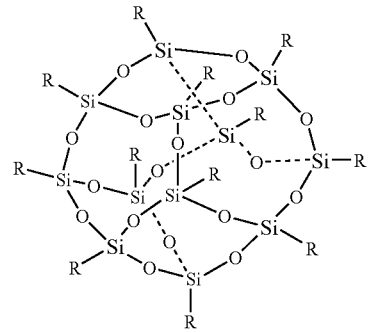

(23)

(24)

$(R\text{-}SiO_{3/2})_{14}$

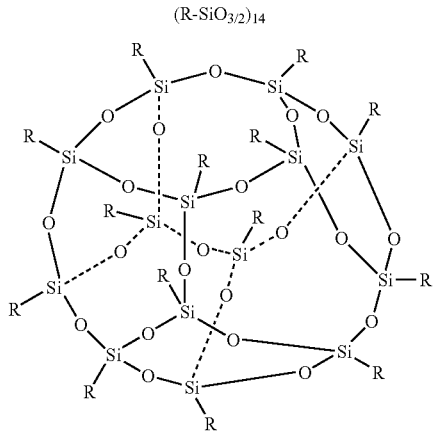

(ii) The partially open structure of the cage structure represented by the Formula (5) represents (ii-1): a structure missing a portion of the silicon atoms from the cage structure, or (ii-2): a structure having a part of the silicon-oxygen bonds in the cage structure cleaved. The value of n is 6 to 18, and preferably 6 to 14 (they are represented by Formulas (25) to (29)).

(25)

$(R\text{-}SiO_{3/2})_7(O_{1/2}R)$

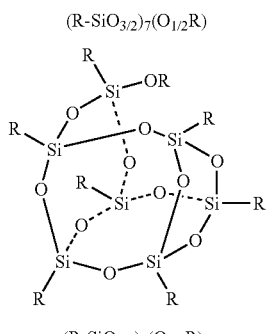

(26)

$(R\text{-}SiO_{3/2})_7(O_{1/2}R)_3$

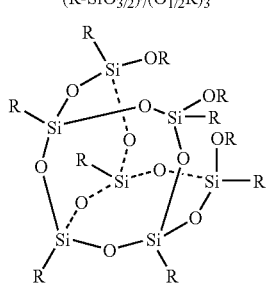

(27)

$(R\text{-}SiO_{3/2})_8(O_{1/2}R)_2$

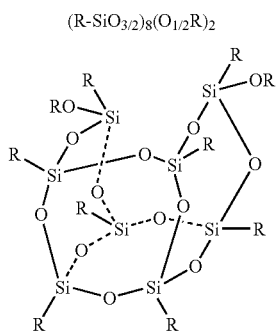

(28)

$(R\text{-}SiO_{3/2})_8(O_{1/2}R)_2$

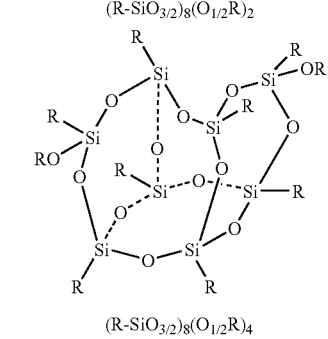

(29)

$(R\text{-}SiO_{3/2})_8(O_{1/2}R)_4$

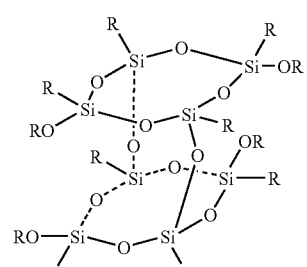

The cage-shaped-like silsesquioxane may be a closed type cage-shaped-like structure or a partially open structure, and has no problem in view of hard coatability as long as the silsesquioxane has a cage-shaped form.

Among the organic groups in the compound, it is desirable if at least one of the organic groups includes a cationic polymerizable group. For the closed type cage-shaped-like structure containing a cationic polymerizable group, the closed type cage-shaped-like silsesquioxane represented by the Formula (6) may be mentioned to be preferable, and for the partially open structure of the cage structure containing a cationic polymerizable group, the partially open type cage-shaped-like silsesquioxane represented by the Formula (7) may be mentioned to be preferable.

(6)

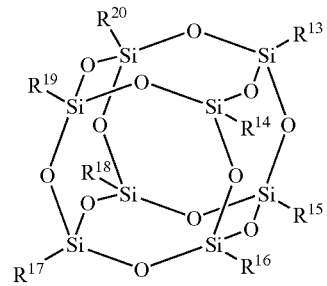

(7)

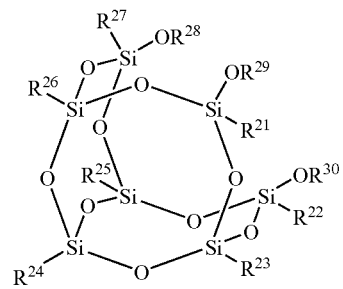

wherein R$^{13}$ to R$^{30}$ each represent a cationic polymerizable group, hydrogen, an alkyl group, a cyclopentyl group, or a cyclohexyl group.

The cationic polymerizable group is not particularly limited, but a preferred cationic polymerizable group may be exemplified by a group having a (methyl)glycidyl ether group (a group containing (2-methyl)oxirane), an oxetanyl group, an epoxy cyclohexyl group, or a vinyl group. From the viewpoints of curability, hard coatability, adhesion, easy availability of the compound, and the like, silsesquioxanes having the cationic polymerizable groups represented by Formula (30) to (33) are preferred.

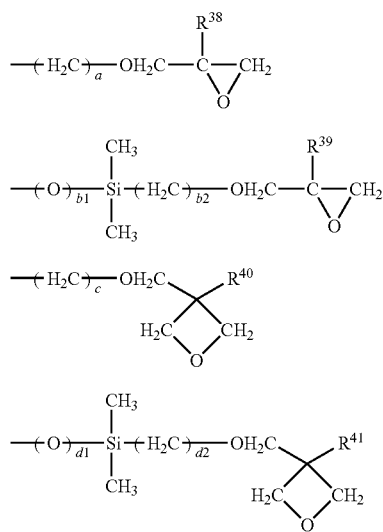

wherein R$^{38}$ and R$^{39}$ each independently represent hydrogen or a methyl group; R$^{40}$ and R$^{41}$ each independently represent a methyl group or an ethyl group; a, b$_2$, c, d$_2$ each independently represent an integer from 1 to 10; and b$_1$ and d$_1$ each independently represent 0 or 1.

When the silsesquioxane contains an organic group other than the cationic polymerizable group, the organic group is preferably hydrogen, an alkyl group having 1 to 4 carbon atoms such as a methyl group, an ethyl group, an n- or i-propyl group, an n-, i-, or t-butyl group, or the like, a cyclopentyl group, a cyclohexyl group or the like. R$^{28}$ to R$^{30}$ in particular are preferably a hydrogen (in this case Si—OH: a silanol group).

The alkyl group as defined above is not particularly limited, but more specific examples thereof include a methyl group, an ethyl group, an n-propyl group, an isopropyl group, an n-butyl group, an isobutyl group, a t-butyl group, an n-amyl group, an isoamyl group, a hexyl group, an octyl group, and the like.

For the definition in the above, an alkyl group having 1 to 4 carbon atoms may be favorably mentioned, and specific examples thereof include a methyl group, an ethyl group, an n- or i-propyl group, an n-, i-, or t-butyl group, and the like.

These compounds are used individually or in combination of two or more species.

Specific examples of the silsesquioxane having a cationic polymerizable group, represented by the Formulas (30) to (33), include tetradeca[2-(butoxymethyl)oxirane]-silsesquioxane(silsesquioxane in which all of the fourteen groups are 2-(butoxymethyl)oxirane groups; hereinafter, will be described in the same manner), dodeca[2-(butoxymethyl)oxirane]-silsesquioxane, deca[2-(butoxymethyl)oxirane]-silsesquioxane, octa[2-(butoxymethyl)oxirane]-silsesquioxane, hexa[2-(butoxymethyl)oxirane]-silsesquioxane, tris[2-(butoxymethyl)oxirane]-ethyl-silsesquioxane(silsesquioxane having three 2-(butoxymethyl)oxirane groups and ethyl groups for the remaining groups; hereinafter, will be described in the same manner), tris[2-(butoxymethyl)oxirane]-cyclohexyl-silsesquioxane, tris[2-(butoxymethyl)oxirane]-cyclopentyl-silsesquioxane, tris[2-(butoxymethyl)oxirane]-isobutyl-silsesquioxane, 2-(butoxymethyl)oxirane-ethyl-silsesquioxane, 2-(butoxymethyl)oxirane-cyclohexyl-silsesquioxane, 2-(butoxymethyl)oxirane-cyclopentyl-silsesquioxane, 2-(butoxymethyl)oxirane-isobutyl-silsesquioxane, 2-(butoxymethyl)oxirane-trisilanol-cyclohexyl-silsesquioxane (silsesquioxane having three silanol groups, and having 2-(butoxymethyl)oxirane groups and cyclohexyl groups for the remaining groups; hereinafter, will be described in the same manner), 2-(butoxymethyl)oxirane-trisilanol-cyclopentyl-silsesquioxane, 2-(butoxymethyl)oxirane trisilanol-isobutyl-silsesquioxane, 2-(butoxymethyl)oxirane-disilanol-cyclohexyl-silsesquioxane, 2-(butoxymethyl)oxirane-disilanol-cyclopentyl-silsesquioxane, 2-(butoxymethyl)oxirane-disilanol-isobutyl-silsesquioxane, 2-(butoxymethyl)oxirane-silanol-cyclohexyl-silsesquioxane, 2-(butoxymethyl)oxirane-silanol-cyclopentyl-silsesquioxane, 2-(butoxymethyl)oxirane-silanol-isobutyl-silsesquioxane, tetradeca[2-(butoxymethyl)oxirane-dimethylsiloxy]-silsesquioxane (silsesquioxane in which all of the fourteen groups are 2-(butoxymethyl) oxirane-dimethylsiloxy groups; hereinafter, will be described in the same manner), dodeca[2-(butoxymethyl)oxirane-dimethylsiloxy]-silsesquioxane, deca[2-(butoxymethyl)oxirane-dimethylsiloxy]-silsesquioxane, octa[2-(butoxymethyl)oxirane-dimethylsiloxy]-silsesquioxane, hexa[2-(butoxymethyl)oxirane-dimethylsiloxy]-silsesquioxane, tris[(2-(butoxymethyl)oxirane-dimethylsiloxy]-ethyl-silsesquioxane, tris[(2-(butoxymethyl)oxirane)-dimethylsiloxy]-cyclohexyl-silsesquioxane, tris[(2-(butoxymethyl)oxirane)-dimethylsiloxy]-cyclopentyl-silsesquioxane, tris[(2-(butoxymethyl)oxirane)-dimethylsiloxy]-isobutyl-silsesquioxane, [(2-(butoxymethyl)oxirane)-dimethylsiloxy]-ethyl-silsesquioxane, [(2-(butoxymethyl)oxirane)-dimethylsiloxy]-cyclohexyl-silsesquioxane, [(2-(butoxymethyl)oxirane)-dimethylsiloxy]-cyclopentyl-silsesquioxane, [(2-(butoxymethyl)oxirane)-dimethylsiloxy]-isobutyl-silsesquioxane, [(2-(butoxymethyl)oxirane)-dimethylsiloxy]-trisilanol-cyclohexyl-silsesquioxane, [(2-(butoxymethyl)oxirane)-dimethylsiloxy]-trisilanol-cyclopentyl-silsesquioxane, [(2-(butoxymethyl)oxirane)-dimethylsiloxy]-trisilanol-isobutyl-silsesquioxane, [(2-(butoxymethyl)oxirane)-dimethylsiloxy]-disilanol-cyclohexyl-silsesquioxane, [(2-(butoxymethyl)oxirane)-dimethylsiloxy]-disilanol-cyclopentyl-silsesquioxane, [(2-(butoxymethyl)oxirane)-dimethylsiloxy]-disilanol-isobutyl-silsesquioxane, [(2-(butoxymethyl)oxirane)-dimethylsiloxy]-silanol-cyclohexyl-silsesquioxane, [(2-(butoxymethyl)oxirane)-dimethylsiloxy]-silanol-cyclopentyl-silsesquioxane, [(2-(butoxymethyl)oxirane)-dimethylsiloxy]-silanol-isobutyl-silsesquioxane, tetradeca[2 (butoxymethyl)-2-methyloxirane]-silsesquioxane, dodeca[2-(butoxymethyl)-2-methyloxirane]-silsesquioxane, deca[2-(butoxymethyl)-2-methyloxirane]-silsesquioxane, octa[2-(butoxymethyl)-2-methyloxirane]-silsesquioxane, hexa[2-(butoxymethyl)-2-methyloxirane]-silsesquioxane, tris[2-(butoxymethyl)-2-methyloxirane]-ethyl-silsesquioxane, tris[2-(butoxymethyl)-2-methyloxirane]-cyclohexyl-silsesquioxane, tris[2-(butoxymethyl)-2-methyloxirane]-cyclopentylsilsesquioxane, tris[2-(butoxymethyl)-2-methyloxirane]-isobutyl-silsesquioxane, 2-(butoxymethyl)-2-methyloxirane-ethyl-silsesquioxane, 2-(butoxymethyl)-2-methyloxirane-cyclohexyl-silsesquioxane, 2-(butoxymethyl)-2-methyloxirane-cyclpentyl-silsesquioxane, 2-(butoxymethyl)-2-methyloxirane-isobutyl-silsesquioxane, 2-(butoxymethyl)-2-methyloxirane-trisilanol-cyclohexyl-silsesquioxane, 2-(butoxymethyl)-2-methyloxirane-trisilanol-cyclopentyl-silsesquioxane, 2-(butoxymethyl)-2-methyloxirane-trisilanol-isobutyl-silsesquioxane, 2-(butoxymethyl)-2-methyloxirane-disilanol-cyclohexyl-silsesquioxane, 2-(butoxymethyl)-2-methyloxirane-disilanol-cyclopentyl-silsesquioxane, 2-(butoxymethyl)-2-methyloxirane-disilanol-isobutyl-silsesquioxane, 2-(butoxymethyl)-2-methyloxirane-silanol-cyclohexyl-silsesquioxane, 2-(butoxymethyl)-2-methyloxirane-silanol-cyclopentyl-silsesquioxane, 2-(butoxymethyl)-2-methyloxirane-silanol-isobutyl-silsesquioxane, tetradeca[(2-(butoxymethyl)-2-methyloxirane)-dimethylsiloxy]-silsesquioxane, dodeca[(2-(butoxymethyl)-2-methyloxirane)-dimethylsiloxy]-silsesquioxane, deca[(2-(butoxymethyl)-2-methyloxirane)-dimethylsiloxy]-silsesquioxane, octa[(2-(butoxymethyl)-2-methyloxirane)-dimethylsiloxy]-silsesquioxane, hexa[(2-(butoxymethyl)-2-methyloxirane)-dimethylsiloxy]-silsesquioxane, tris[(2-(butoxymethyl)-2-methyloxirane)-dimethylsiloxy]-ethyl-silsesquioxane, tris[(2-(butoxymethyl)-2-methyloxirane)-dimethylsiloxy]-cyclohexyl-silsesquioxane, tris[(2-(butoxymethyl)-2-methyloxirane)-dimethylsiloxy]-cyclopentyl-silsesquioxane, tris[(2-(butoxymethyl)-2-methyloxirane)-dimethylsiloxy-isobutyl-silsesquioxane, [(2-(butoxymethyl)-2-methyloxirane)-dimethylsiloxy]-ethyl-silsesquioxane, [(2-(butoxymethyl)-2-methyloxirane)-dimethylsiloxy]-cyclohexyl-silsesquioxane, [(2-(butoxymethyl)-2-methyloxirane)-dimethylsiloxy]-cyclopentyl-silsesquioxane, [(2-(butoxymethyl)-2-methyloxirane)-dimethylsiloxy]-isobutyl-silsesquioxane, [(2-(butoxymethyl)-2-methyloxirane)-dimethylsiloxy]-trisilanol-cyclohexyl-silsesquioxane, [(2-(butoxymethyl)-2-methyloxirane)-dimethylsiloxy]-trisilanol-cyclopentyl-silsesquioxane, [(2-(butoxymethyl)-2-methyloxirane)-dimethylsiloxy]-trisilanol-isobutyl-silsesquioxane, [(2-(butoxymethyl)-2-methyloxirane)-dimethylsiloxy]-disilanol-cyclohexyl-silsesquioxane, [(2-(butoxymethyl)-2-methyloxirane)-dimethylsiloxy]-disilanol-cyclopentyl-silsesquioxane, [(2-(butoxymethyl)-2-methyloxirane)-dimethylsiloxy]-disilanol-isobutyl-silsesquioxane, [(2-(butoxymethyl)-2-methyloxirane)-dimethylsiloxy]-silanol-cyclohexyl-silsesquioxane, [(2-(butoxymethyl)-2-methyloxirane)-dimethylsiloxy]-silanol-cyclopentyl-silsesquioxane, [(2-(butoxymethyl)-2-methyloxirane)-dimethylsiloxy]-silanol-isobutyl-silsesquioxane, tetradeca(3-ethyl-3-butoxymethyloxetane)-silsesquioxane, dodeca(3-ethyl-3-butoxymethyloxetane)-silsesquioxane, deca(3-ethyl-3-butoxymethyloxetane)-silsesquioxane, octa(3-ethyl-3-butoxymethyloxetane)-silsesquioxane, hexa(3-ethyl-3-butoxymethyloxetane)-silsesquioxane, tris(3-ethyl-3-butoxymethyloxetane)-ethyl-silsesquioxane, tris(3-ethyl-3-butoxymethyloxetane)-cyclohexyl-silsesquioxane, tris(3-ethyl-3-butoxymethyloxetane)-cyclopentyl-silsesquioxane, tris(3-ethyl-3-butoxymethyloxetane)-isobutyl-silsesquioxane, 3-ethyl-3-butoxymethyloxetane ethyl-silsesquioxane, 3-ethyl-3-butoxymethyloxetane cyclohexyl-silsesquioxane, 3-ethyl-3-butoxymethyloxetane cyclopentyl-silsesquioxane, 3-ethyl-3-butoxymethyloxetane isobutyl-silsesquioxane, 3-ethyl-3-butoxymethyloxetane trisilanol-cyclohexyl-silsesquioxane, 3-ethyl-3-butoxymethyloxetane trisilanol-cyclopentyl-silsesquioxane, 3-ethyl-3-butoxymethyloxetane trisilanol-isobutyl-silsesquioxane, 3-ethyl-3-butoxymethyloxetane-disilanol-cyclohexyl-silsesquioxane, 3-ethyl-3-butoxymethyloxetane-disilanol-cyclopentyl-silsesquioxane, 3-ethyl-3-butoxymethyloxetane-disilanol-isobutyl-silsesquioxane, 3-ethyl-3-butoxymethyloxetane-silanol-cyclohexyl-silsesquioxane, 3-ethyl-3-butoxymethyloxetane-silanol-cyclopentyl-silsesquioxane, 3-ethyl-3-butoxymethyloxetane-silanol-isobutyl-silsesquioxane, tetradeca[(3-ethyl-3-butoxymethyloxetane)-dimethylsiloxy]-silsesquioxane, dodeca[(3-ethyl-3-butoxymethyloxetane)-dimethylsiloxy]-silsesquioxane, deca[(3-ethyl-3-butoxymethyloxetane)-dimethylsiloxy]-silsesquioxane, octa[(3-ethyl-3-butoxymethyloxetane)-dimethylsiloxy]-silsesquioxane, hexa[(3-ethyl-3-butoxymethyloxetane)-dimethylsiloxy]-silsesquioxane, tris[(3-ethyl-3-butoxymethyloxetane)-dimethylsiloxy]-ethyl-silsesquioxane, tris[(3-ethyl-3-butoxymethyloxetane)-dimethylsiloxy]-cyclohexyl-silsesquioxane, tris[(3-ethyl-3-butoxymethyloxetane)-dimethylsiloxy]-cyclopentyl-silsesquioxane, tris[(3-ethyl-3-butoxymethyloxetane)-dimethylsiloxy]-isobutyl-silsesquioxane, [(3-ethyl-3-butoxymethyloxetane)-dimethylsiloxy]-ethyl-silsesquioxane, [(3-ethyl-3-butoxymethyloxetane)-dimethylsiloxy]-cyclohexyl-silsesqulioxane, [(3-ethyl-3-butoxymethyloxetane)-dimethylsiloxy]-cyclopentyl-silsesquioxane, [(3-ethyl-3-butoxymethyloxetane)-dimethylsiloxy]-isobutyl-silsesquioxane, [(3-ethyl-3-butoxymethyloxetane)-dimethylsiloxy]-trisilanol-cyclohexyl-silsesquioxane, [(3-ethyl-3-butoxymethyloxetane)-dimethylsiloxy]-trisilanol-cyclopentyl-silsesquioxane, [(3-ethyl-3-butoxymethyloxetane)-dimethylsiloxy]-trisilanol-isobutyl-silsesquioxane, [(3-ethyl-3-butoxymethyloxetane)-dimethylsiloxy]-disilanol-cyclohexyl-silsesquioxane, [(3-ethyl-3-butoxymethyloxetane)-dimethylsiloxy]-disilanol-cyclopentyl-silsesquioxane, [(3-ethyl-3-butoxymethyloxetane)-dimethylsiloxy]-disilanol-isobutyl-silsesquioxane, [(3-ethyl-3-butoxymethyloxetane)-dimethylsiloxy]-silanol-cyclohexyl-silsesquioxane, [(3-ethyl-3-butoxymethyloxetane)-dimethylsiloxy]-silanol-cyclopentyl-silsesquioxane; [(3-ethyl-3-butoxymethyloxetane)-dimethylsiloxy]-silanol-isobutyl-silsesquioxane, tetradeca(3-methyl-3-butoxymethyloxetane)-silsesquioxane, dodeca(3-methyl-3-butoxymethyloxetane)-silsesquioxane, deca(3-methyl-3-butoxymethyloxetane)-silsesquioxane, octa(3-methyl-3-butoxymethyloxetane)-silsesquioxane, hexa(3-methyl-3-butoxymethyloxetane)-silsesquioxane, tris(3-methyl-3-butoxymethyloxetane)-ethyl-silsesquioxane, tris(3-methyl-3-butoxymethyloxetane)-cyclohexyl-silsesquioxane, tris(3-methyl-3-butoxymethyloxetane)-cyclopentyl-silsesquioxane, tris(3-methyl-3-butoxymethyloxetane)-isobutyl-silsesquioxane, 3-methyl-3-butoxymethyloxetane ethyl-silsesquioxane, 3-methyl-3-butoxymethyloxetane cyclohexyl-silsesquioxane, 3-methyl-3-butoxymethyloxetane cyclopentyl-silsesquioxane, 3-methyl-3-butoxymethyloxetane isobutyl-silsesquioxane, 3-methyl-3-butoxymethyloxetane trisilanol-cyclohexyl-silsesquioxane, 3-methyl-3-butoxymethyloxetane trisilanol-cyclopentyl-silsesquioxane, 3-methyl-3-butoxymethyloxetane trisilanol-isobutyl-silsesquioxane, 3-methyl-3-butoxymethyloxetane disilanol-cyclohexyl-silsesquioxane, 3-methyl-3-butoxymethyloxetane disilanol-cyclopentyl-silsesquioxane, 3-methyl-3-butoxymethyloxetane-disilanol-isobutyl-silsesquioxane, 3-methyl-3-butoxymethyloxetane-silanol-cyclohexyl-silsesquioxane, 3-methyl-3-butoxymethyloxetane-silanol-cyclopentyl-silsesquioxane, 3-methyl-3-butoxymethyloxetane-silanol-isobutyl-silsesquioxane, tetradeca[(3-methyl-3-butoxymethyloxetane)-dimethylsiloxy]-silsesquioxane, dodeca[(3-methyl-3-butoxymethyloxetane)-dimethylsiloxy]-silsesquioxane, deca[(3-methyl-3-butoxymethyloxetane)-dimethylsiloxy]-silsesquioxane, octa[(3-methyl-3-butoxymethyloxetane)-dimethylsiloxy]-silsesquioxane, hexa[(3-methyl-3-butoxymethyloxetane)-dimethylsiloxy]-silsesquioxane, tris[(3-methyl-3-butoxymethyloxetane)-dimethylsiloxy]-ethyl-silsesquioxane, tris[(3-methyl-3-butoxymethyloxetane)-dimethylsiloxy]-cyclohexyl-silsesquioxane, tris[(3-methyl-3-butoxymethyloxetane)-dimethylsiloxy]-cyclopentyl-silsesquioxane, tris[(3-methyl-3-butoxymethyloxetane)-dimethylsiloxy]-isobutyl-silsesquioxane, [(3-methyl-3-butoxymethyloxetane)-dimethylsiloxy]-ethyl-silsesquioxane, [(3-methyl-3-butoxymethyloxetane)-dimethylsiloxy]-cyclohexyl-silsesquioxane, [(3-methyl-3-butoxymethyloxetane)-dimethylsiloxy]-cyclopentyl-silsesquioxane, [(3-methyl-3-butoxymethyloxetane)-dimethylsiloxy]-isobutyl-silsesquioxane, [(3-methyl-3-butoxymethyloxetane)-dimethylsiloxy]-trisilanol-cyclohexyl-silsesquioxane, [(3-methyl-3-butoxymethyloxetane)-dimethylsiloxy]-trisilanol-cyclopentyl-silsesquioxane, [(3-methyl-3-butoxymethyloxetane)-dimethylsiloxy]-trisilanol-isobutyl-silsesquioxane, [(3-methyl-3-butoxymethyloxetane)-dimethylsiloxy]-disilanol-cyclohexyl-silsesquioxane, [(3-methyl-3-butoxymethyloxetane)-dimethylsiloxy]-disilanol-cyclopentyl-silsesquioxane, [(3-methyl-3-butoxymethyloxetane)-dimethylsiloxy]-disilanol-isobutyl-silsesquioxane, [(3-methyl-3-butoxymethyloxetane)-dimethylsiloxy]-silanol-cyclohexyl-silsesquioxane, [(3-methyl-3-butoxymethyloxetane)-dimethylsiloxy]-silanol-cyclopentyl-silsesquioxane, [(3-methyl-3-butoxymethyloxetane)-dimethylsiloxy]-silanol-isobutyl-silsesquioxane, and the like.

Herein, for the cage-shaped-like organosilsesquioxane containing a cationic polymerizable group, those commercially available products also can be used, and examples thereof include EP0415 (GlycidylCyclohexyl-POSS), EP0416 (GlycidylCyclopentyl-POSS), EP0417 (GlycidylEthyl-POSS), EP0418 (GlycidylIsobutyl-POSS), EP0435 (Octahlycidyldimethylsilyl-POSS), EP0421 (TrisGlycidylCyclohexyl-POSS), EP0420 (TrisGlycidylCyclopentyl-PbSS), EP0422 (TrisGlycidylEthyl-POSS), EP0423 (TrisGlycidylIsobutyl-POSS) (all manufactured by Hybrid Plastics, Inc.; trade name), which are disclosed in the Internet on a website of the following address: <http://www.hybridplastics.com/pdf/2006catalog.pdf>; PSS-Octa((3-propylglycidylether)-Dimethylsiloxy) substituted (reagent by Sigma-Aldrich, Inc.), which is disclosed in the Internet on a website of the following address: <http://www.sigma-aldrich.co.jp/up_catalog/A-116.pdf>, oxetanylsilsesquioxane (OX—SQ), oxetanylsilsesquioxane (OX—SQ-H) (trade names by Toagosei, Co., Ltd.; trade name), which are disclosed in Toagosei Research Annual, TREND, 1999, No. 3 and Toagosei Research Annual, TREND, 2004, No. 7, and the like, which can be suitably used. This cationic polymerizable silsesquioxane is compatible with cationic polymerizable compounds, unlike silica nanoparticles that are perfectly inorganic materials, and thus, the cationic polymerizable silsesquioxane is easy to handle and is excellent in moldability during film forming and the like.

The silicate compound, which is the component (C) according to the invention, will be described. The silicate compound used in the invention is a compound having a fundamental skeleton of the Formula (2), which is obtained by partially hydrolyzing tetrafunctional alkoxysilane.

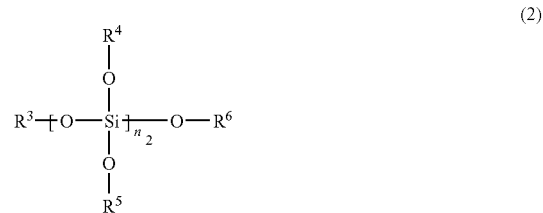

(2)

wherein $R^3$ to $R^6$ are each independently an organic group having a cationic polymerizable group, hydrogen or an alkyl group; and $n_2$ represents an integer from 2 to 10.

For the Formula (2), $R^3$ to $R^6$ each independently represent an organic group having a cationic polymerizable group, hydrogen or an alkyl group.

The alkyl group as defined above is not particularly limited, but may be more specifically exemplified by a methyl group, an ethyl group, an n-propyl group, an isopropyl group, an n-butyl group, an isobutyl group, a t-butyl group, an n-amyl group, an isoamyl group, a hexyl group, an octyl group, a cyclohexyl group, or the like.

For the definition in the above, an alkyl group having 1 to 4 carbon atoms maybe favorably mentioned, and specific examples thereof include a methyl group, an ethyl group, an n- or i-propyl group, an n-, i- or t-butyl group, or the like.

Since this silicate compound is compatible with cationic polymerizable compounds, unlike silica nanoparticles that are perfectly inorganic materials, this silicate compound is easy to handle and is excellent in moldability during film forming and the like.

Here, the silicate compound containing a cationic polymerizable group, which contains at least one or more cationic polymerizable groups on $R^3$ to $R^6$, can be prepared by an alcohol exchange reaction of an alkoxy silicate and a cationic polymerizable group-containing alcohol compound. The cationic polymerizable group is not particularly limited, but as a preferred cationic polymerizable group, a group including a methyl glycidyl ether group (a group containing (2-methyl) oxirane), an oxetanyl group, an epoxycyclohexyl group or a vinyl group may be mentioned.

The silicate containing a cationic polymerizable group according to the invention may be exemplified by silicate containing a (methyl)glycidyl ether group (a group containing (2-methyl)oxirane), silicate containing an oxetanyloxy group, silicate containing an epoxycyclohexyloxy group, or the like. From the viewpoints of curability, hard coatability, adhesion, easy availability of the compound, and the like, silicates having the cationic polymerizable groups represented by Formulas (34) and (35) are preferred.

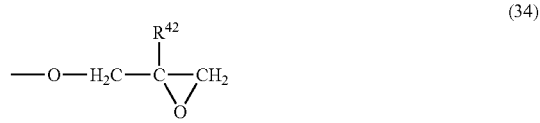

(34)

(35)

wherein $R^{42}$ represents hydrogen or a methyl group; and $R^{43}$ represents a methyl group or an ethyl group.

In addition, an alkoxysilicate which is not substituted with a cationic polymerizable group also can form a three-dimensional network structure by producing silanol under ultraviolet irradiation in the presence of a Lewis acid-generating type cationic photopolymerization initiator, and then forming siloxane bonds, and thus, the alkoxysilicate can be used for the invention.

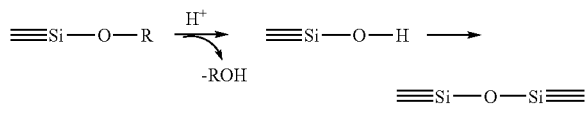

wherein R represents an organic group.

It is preferable that the alkoxy group does not have any residual alcohol compound released after the silanol generation, and silicates containing an alkoxy group having 1 to 4 carbon atoms, such as a methoxy group, an ethoxy group, an n- or i-propoxy group, an n-, i- or t-butoxy group, or the like, are preferred.

These compounds are used alone or in combination of two or more species.

Specific examples of the silicate having a cationic polymerizable group represented by the Formula (22) or (23) include tetrakis(oxiran-2-yl-methoxy)polysilicate, tetrakis (2-methyloxyran-2-yl-methoxy)polysilicate, tetrakis[(3-ethyloxetan-3-yl)methoxy]polysilicate, tetrakis [(3-methyloxetan-3-yl)methoxy]polysilicate, and the like.

As the alkoxysilicate which is not substituted with a cationic polymerizable group, polymethoxysilicate, polyethoxysilicate, polypropoxysilicate and the like may be mentioned.

Here, for the silicate compound, those commercially available compounds can also be used, and examples thereof include, as a silicate containing a (3-ethyloxetan-3-yl)methoxy group with $n_2$ being 5 in average, oxetanylsilicate (OX—SC) (Toagosei Co., Ltd.; trade name) and the like; and as a silicate having a methoxy group or an ethoxy group, M Silicate 51 (methoxy group, $n_2$=4 in average), M silicate 60 (methoxy group, $n_2$=9 in average), Silicate 40 (ethoxy group, $n_2$=5 in average) (all by Tama Chemicals Co., Ltd.; trade name), and the like, which can be suitably used.

The silane compound or a partial condensed compound, which is the component (D) according to the invention, will be described. The silane compound used for the invention is a silane compound represented by the Formula (3) or a partial condensed compound.

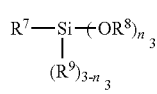 (3)

wherein $R^7$ is an organic group having a cationic polymerizable group; $R^8$ and $R^9$ are each independently hydrogen or an alkyl group; and $n_3$ represents an integer from 1 to 3.

In the Formula (3), $R^7$ is an organic group having a cationic polymerizable group, and $R^8$ and $R^9$ each independently represent hydrogen or an alkyl group.

The alkyl group as defined above is not particularly limited, but more specific examples thereof include a methyl group, an ethyl group, an n-propyl group, an isopropyl group, an n-butyl group, an isobutyl group, a t-butyl group, an n-amyl group, an isoamyl group, a hexyl group, an octyl group, a cyclohexyl group, and the like.

For the definition above, an alkyl group having 1 to 4 carbon atoms maybe favorably mentioned, and specific examples thereof include a methyl group, an ethyl group, an n- or i-propyl group, an n-, i- or t-butyl group, and the like.

The cationic polymerizable group $R^7$ of the silane compound is not particularly limited, but groups including a (methyl)glycidyl ether group, an oxetanyl group, an epoxycyclohexyl group and the like may be favorably mentioned. From the viewpoints of curability, hard coatability, adhesion, easy availability of the compound, and the like, the silane compounds having cationic polymerizable groups represented by Formulas (36) and (37) are preferred.

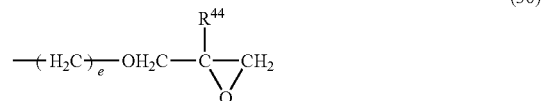 (36)

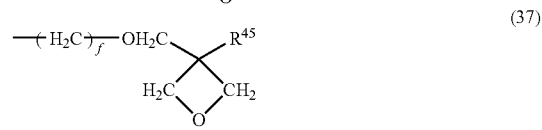 (37)

wherein $R^{44}$ represents hydrogen or a methyl group; $R^{45}$ represents a methyl group or an ethyl group; and e to f each independently represent an integer from 1 to 10.

These compounds are used alone or in combination of two or more species.

Specific examples of this silane compound include 3-glycidoxypropyltrimethoxysilane, 3-glycidoxypropylmethyldimethoxysilane, 3-glycidoxypropyldimethylmethoxysilane, 3-glycidoxypropyltriethoxysilane, 3-glycidoxypropylethyldiethoxysilane, 3-glyciedoxypropyldiethylethoxysilane, 3-ethyl-3-{[3-(trimethoxysilyl)propoxy]methyl}oxetane, 3-ethyl-3-{[3-(triethoxysilyl)propoxy]methyl}oxetane, and the like. Since these compounds have low viscosities, they can lower the viscosity of the whole composition. The silane compounds can form a three-dimensional network structure since both the cationic polymerizable group and the alkoxy group react under ultraviolet irradiation in the presence of a Lewis acid-generating type cationic photopolymerization initiator, and the compound can increase hard coatability. Moreover, these compounds, also referred to as silane coupling agents, have a function of promoting the adhesion to thiourethane resins or thioepoxy resins. A silane compound having a portion of the alkoxy groups partially condensed to increase the reactivity of the compound may also be used, and preferably a mixture of a silane compound and a partial condensated compound thereof is used.

According to the invention, 5 to 40 parts by weight of the component (A), and 60 to 95 parts by weight of the total of the components (B), (C) and (D), based on 100 parts by weight of the total of the components (A) to (D), are used. If the component (A) is in excess, sufficient hard coatability may not be obtained. If the component (A) is insufficient, the film becomes brittle, and sufficient adhesion may not be obtained. More specifically, 5 to 40 parts by weight of the component (B), 5 to 40 parts by weight of the component (C), and 15 to 85 parts by weight of the component (D), based on 100 parts by weight of the total of the components (A) to (D), are used.

If the component (B) is insufficient, sufficient hard coatability may not be obtained. If the component (B) is in excess, the curing rate is decreased, and thus, the reaction rate of the overall system may possibly be decreased. If the component (C) is insufficient, a sufficient curing rate or hard coatbility may not be obtained. If the component (C) is in excess, the residual amount of unreacted silanol groups or alcohol compounds generated as side products is likely to be increased, and water resistance may be easily deteriorated. If the component (D) is insufficient, sufficient dilution may not occur, and further, the adhesion to thiourethane resins or thioepoxy resins may be deteriorated. If the component (D) is in excess, the residual amount of unreacted silanol groups or alcohol compounds generated as side products is likely to be increased, and water resistance may be easily deteriorated.

The cationic photopolymerization initiator, which is the component (E) according to the invention, will be described.

The component (E) is not particularly limited as long as the compound is able to initiate cationic polymerization by light, and any compound can be used. Preferred examples of the cationic photopolymerization initiator include onium salts having a structure represented by the following Formula (38). This onium salt is a compound releasing Lewis acid after undergoing a photoreaction.

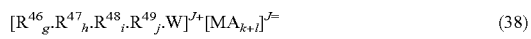

$$[R^{46}{}_g \cdot R^{47}{}_h \cdot R^{48}{}_i \cdot R^{49}{}_j \cdot W]^{J+}[MA_{k+l}]^{J-} \quad (38)$$

wherein $J^+$ represents a cation, and $J^-$ represents an anion, the cation being an onium ion; W represents S, Se, Te, P, As, Sb, Bi, O, I, Br, Cl or N≡N; $R^{46}$, $R^{47}$, $R^{48}$ and $R^{49}$ are identical or different organic groups; g, h, I and j are each an integer from 0 to 3, while (g+h+i+j) is equal to ((valency of $W)_{k+l}$); M is a metal or metalloid constituting the central atom of a halogenated complex $[MA_{k+l}]$; A is a halogen atom; l is the net charge of the halogenated complex ion; and k is the valency of l.

In the above formula, M is a metal or metalloid constituting the central atom of a halogenated complex $[MA_{k+l}]$, and specific examples thereof include B, P, As, Sb, Fe, Sn, Bi, Al, Ca, In, Ti, Zn, Sc, V, Cr, Mn, Co and the like.

Furthermore, A is a halogen atom, and specific examples thereof include F, Cl, Br and the like.

For the Formula (26), specific examples of the onium ion include diphenyliodonium, 4-methoxydiphenyliodonium, bis(4-methylphenyl)iodonium, bis(4-tert-butylphenyl)iodonium, bis(dodecylphenyl)iodonium, triphenylsulfonium, diphenyl-4-thiophenoxyphenylsulfonium, bis[4-(diphenylsulfonio)phenyl]sulfide, bis[4-(di(4-(2-hydroxyethyl)phenyl)sulfonio)-phenyl]sulfide, η⁵-2,4-(cyclopentadienyl)[1,2,3,4,5,6-η-(methylethyl)benzene]-iron(1+), and the like.

Specific examples of the anion for the Formula (26) include tetrafluoroborate, hexafluorophosphate, hexafluoroantimonate, hexachloroantimonate, and the like.

As the anion for the Formula (26), perchlorate ion, trifluoromethanesulfonate ion, toluenesulfonate ion, trinitrotoluenesulfonate ion, and the like may also be used instead of the halogenated complex $[MA_{k+l}]$.

Also, as the anion for the Formula (26), aromatic anions may be used instead of the halogenated complex $[MA_{k+l}]$. Specific examples thereof include tetra(fluorophenyl)borate, tetra(difluorophenyl)borate, tetra(trifluorophenyl)borate, tetra(tetrafluorophenyl)borate, tetra(pentafluorophenyl)borate, tetra(perfluorophenyl)borate, tetra(trifluoromethylphenyl)borate, tetra(di(trifluoromethyl)phenyl)borate, and the like.

Commercially available products can also be used as the cationic photopolymerization initiator, and Uvacure 1590 and 1591 (all manufactured by Daicel-UCB Co., Ltd.; trade name), Adecaoptomer SP-100, SP-170, SP-172, SP-150 and SP-152 (all manufactured by Asahi Denka Co., Ltd; trade name), and Rhodorsil 2074 (Rhodia, Inc.; trade name) can be suitably used.

These cationic photopolymerization initiators can be used alone or in combination of two or more species.

According to the invention, the content of the component (E) is usually 0.1 to 10 parts by weight, preferably 0.3 to 5 parts by weight, based on 100 parts by weight of the total of the components (A) to (D). When the content of the component (E) is 0.1 parts by weight or more, the curing status of the resin composition becomes better, which is desirable. On the other hand, from the viewpoint of preventing elution of the cationic photopolymerization initiator after curing, it is preferable to use 10 parts by weight or less.

Moreover, if necessary, a cationic photo polymerization promoter can be used in combination. Specifically, 9,10-dimethoxy-2-ethyl-anthracene, 9,10-diethoxyanthracene, 2,4-diethylthioxantone, and the like may be mentioned.

In addition, a compound generating a cation species or Lewis acid by heat, for example, a thermally latent cationic polymerization initiator, can also be used in combination. Specifically, triphenylsulfonium boron tetrafluoride, triphenylsulfonium antimony hexafluoride, triphenylsulfonium arsenic hexafluoride, tri(4-methoxyphenyl)sulfonium arsenic hexafluoride, diphenyl(4-phenylthiophenyl)sulfonium arsenic hexafluoride, p-t-butylbenzyltetrahydrothiophenium antimony hexafluoride, and the like; among anilinium salt compounds, N,N-dimethyl-N-benzylanilinium antimony hexafluoride, N,N-dimethyl-N-benzylanilinium boron tetrafluoride, N,N-dimethyl-N-(4-chlorobenzyl)anilinium antimony hexafluoride, and N,N-dimethyl-N-(1-phenylethyl)anilinium antimony hexafluoride; among pyridinium salt compounds, N-benzyl-4-dimethylaminopyridinium antimony hexafluoride, N-benzyl-4-diethylaminopyridinium trifluoromethanesulfonate, N-(4-methoxybenzyl)-4-dimethylaminopyridinium antimony hexafluoride, N-(4-methoxybenzyl)-4-diethylaminopyridinium antimony hexafluoride, and the like; among toluidinium salt compounds, N,N-dimethyl-N-(4-methoxybenzyl) toluidinium antimony hexafluoride, N,N-diethyl-N-(4-methoxybenzyl) toluidinium antimony hexafluoride, and the like; among phosphonium salt compounds, ethyltriphenylphosphonium antimony hexafluoride, tetrabutylphosphonium antimony hexafluoride, and the like; among iodonium salt compounds, diphenyliodonium arsenic hexafluoride, di-4-chlorophenyliodonium arsenic hexafluoride, di-4-bromophenyliodonium arsenic hexafluoride, di-p-tolyliodonium arsenic hexafluoride, phenyl-(4-methoxyphenyl)iodonium arsenic hexafluoride, and the like may be mentioned.

Examples of commercially available thermally latent cationic polymerization initiator include Sanaid SI-60L, Sanaid SI-80L, Sanaid SI-100L, Sanaid SI-80, Sanaid SI-100, Sanaid SI-145, Sanaid SI-150, Sanaid SI-160 (all manufactured by SANSHIN CHEMICAL INDUSTRY CO., LTD.; trade name), and the like.

These initiators may be used alone or in combination of two or more species. It is also possible to proceed the curing further after light irradiation, by using heat in combination.

The ultraviolet absorber, which is the component (F) according to the invention, will be described.

The ultraviolet absorber (F) used for the invention refers to a compound which absorbs ultraviolet rays having a wavelength of 400 nm or less, and takes a stable form without the compound itself decomposing, such as dissipating the absorbed energy as thermal energy or the like. According to the invention, the ultraviolet absorber has a function of inhibiting deterioration of the thiourethane resins or thioepoxy resins used as the substrate, by blocking ultraviolet rays of 400 nm or less. As the ultraviolet absorber in general, benzophenone-based ultraviolet absorbers, triazine-based ultraviolet absorbers, benzotriazole-based ultraviolet absorbers, salicylic acid-based ultraviolet absorbers, cyanoacrylate-based ultraviolet absorbers, inorganic oxides such as zinc oxide, titanium oxide and the like, and the like may be mentioned. Among these, it is preferable for the composition of the invention to contain at least one or more ultraviolet absorber having a maximum absorption wavelengths in the region raging from 320 to 400 nm (UV-A), which occupies about 90% of the solar ultraviolet rays, and the 2-hydroxy-benzophenone-based ultraviolet absorber represented by the Formula (8) is particularly preferable because it absorbs up to near 400 nm.

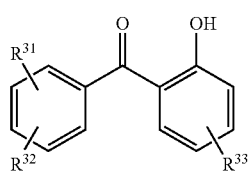

(8)

wherein $R^{31}$ to $R^{33}$ each independently represent a hydroxyl group, a hydrogen atom, an alkyl group, or an alkoxy group.

This 2-hydroxybenzophenone-based ultraviolet absorber may be more specifically exemplified by 2-hydroxybenzophenone, 2,2'-dihydroxyphenone, 2,4-dihydroxybenzophenone (Sumisorb 100, Sumitomo Chemical Co., Ltd.; trade name), 2-hydroxy-4-methoxybenzophenone, 2-hydroxy-4-methoxy-4'-methylbenzophenone, 2,2'-dihydroxy-4-methoxybenzophenone, 2,4,4'-trihydroxybenzophenone, 2,2',4,4'-tetrahydroxybenzophenone, 2,3,4,4'-tetrahydroxybenzophenone, 2,3',4,4'-tetrahydroxybenzophenone, or 2,2'-dihydroxy-4,4'-dimethoxybenzophenone. Among these, 2,2',4,4'-tetrahydroxybenzophenone, which has large absorption in the region of from 320 to 400 nm (UV-A), especially in the region of from 380 to 400 nm where the light quantity of solar light is large, can be most suitably used.

In addition, one or more triazine-based ultraviolet absorbers or benzotriazole-based ultraviolet absorbers, which have different maximum absorption wavelengths, can be used, and it is preferable since these absorbers can efficiently block ultraviolet rays of 400 nm or less.

The triazine-based ultraviolet absorber may be more specifically exemplified by 2-[4-[(2-hydroxy-3-dodecyloxypropyl)oxy]-2-hydroxyphenyl]-4,6-bis(2,4-dimethylphenyl)-1,3,5-triazine/2-[4-[(2-hydroxy-3-tridecyloxypropyl)oxy]-2-hydroxyphenyl]-4,6-bis(2,4-dimethylphenyl)-1,3,5-triazine (TINUVIN 400, Ciba Specialty Chemicals, Inc.; trade name), or 2,4-bis(2,4-dimethylphenyl)-6-(2-hydroxy-4-iso-octyloxyphenyl)-s-triazine (TINUVIN 411L, Ciba Specialty Chemicals, Inc.; trade name).

The benzotriazole derivative may be more specifically exemplified by 2-(2-hydroxy-5-t-butylphenyl)-2H-benzotriazole (TINUVIN PS, Ciba Specialty Chemicals, Inc.; trade name), benzenepropionic acid, 3-(2H-benzotriazol-2-yl)-5-(1,1-dimethylethyl)-4-hydroxy-C7-9-alkyl ester (TINUVIN 99-2, Ciba Specialty Chemicals, Inc.; trade name), octyl-3-[3-t-butyl-4-hydroxy-5-(5-chloro-2H-benzotriazol-2-yl)phenyl]propionate (TINUVIN 109, Ciba Specialty Chemicals, Inc.; trade name), 2-(2H-benzotriazol-2-yl)-4,6-di-t-pentylphenol (TINUVIN 328, Ciba Specialty Chemicals, Inc.; trade name), 2-(2H-benzotriazol-2-yl)-4,6-bis(1-methyl-1-phenylethyl)phenol (TINUVIN 928, Ciba Specialty Chemicals, Inc.; trade name), or α-[3-[3-(2H-benzotriazol-2-yl)-5-(1,1-dimethylethyl)-4-hydroxyphenyl]-1-oxopropyl]-ω-hydroxy poly(oxo-1,2-ethanediyl)/α-[3-[3-(2H-benzotriazol-2-yl)-5-(1,1-dimethylethyl)-4-hydroxyphenyl]-1-oxopropyl]-ω-[3-[3-(2H-benzotriazol-2-yl)-5-(1,1-dimethylethyl)-4-hydroxyphenyl]-1-oxopropoxy]poly(oxy-1,20-ethanediyl) (TINUVIN 1130, Ciba Specialty Chemicals, Inc.; trade name).

According to the invention, the content of the component (F) is usually 0.1 to 10 parts by weight, preferably 0.3 to 6 parts by weight, based on 100 parts by weight of the total of the components (A) to (D). When the content of the component (F) is 0.1 parts by weight or greater, weather resistance is improved, which is preferable. On the other hand, if the content is too high, curability may be deteriorated, or coloration may occur, and thus, a content of 10 parts by weight or less is preferable. In addition, the effect of adding the ultraviolet absorber can be confirmed by performing a pseudo exposure using a sunshine weather meter using a carbon arc lamp or a xenon lamp.

The compound having a dimethylsiloxane skeleton represented by the Formula (9), which is the component (G) according to the invention, will be described. In general, those in which a part of the side chains of the dimethylsiloxane represented by the Formula (10) is modified with polyether such as ethylene oxide, propylene oxide or the like, and those having silsesquioxane attached to the dimethylsiloxane main chain or to the side chains are suitably used.

(9)

wherein $x_1$ is an integer from 1 to 10,000.

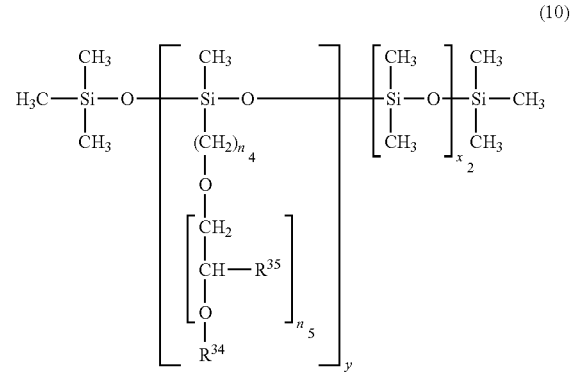

(10)

wherein $R^{35}$ represents a hydrogen atom, an alkyl group having 1 to 4 carbon atoms; $R^{34}$ represents a hydrogen atom, an alkyl group having 1 to 4 carbon atoms, a cationic polymerizable group or an ethylenic unsaturated group; $n_4$ and $n_5$ are each an integer from 1 to 5; $x_2$ is an integer from 1 to 70; y is an integer from 1 to 30; and $y/x_2$ is 1 or less.

By adding the component (G), the surface tension can be adjusted, and thus, an effect of preventing eye holes upon coating the resin surface or improving the smoothness of the coating can be obtained. Furthermore, since the dimethylsiloxane moiety tends to bleed to the surface of the coating, the sliding properties are improved, and good scratch resistance can be expected. Also, those modified with polyether or attached with silsesquioxane are highly soluble.

The content of the component (G) is usually 10 parts by weight or less, preferably 0.01 to 10 parts by weight, more preferably 0.1 to 5 parts by weight, based on 100 parts by weight of the total of the components (A) to (D). If the content is too low, the above-described effects may not be sufficiently expected. If the content is too high, there may be an adverse effect on the curability. The surface condition may also be deteriorated.

Specific examples of the component (G) include commercially available products. As the dimethylsiloxane derivative having the side chains modified with polyether, BYK-306, BYK-307, BYK-333, BYK-375, BYK-UV3500 and BYK-UV3510 (all manufactured by BYK-Chemie GmbH; trade name) may be mentioned, and as the product having silsesquioxane attached to the main chain or side chains, oxetanyl-silsesquioxane (OX—SQS120) (Toagosei Co., Ltd.; trade name) may be mentioned.

When silica nanoparticles are added as the component (H), hardness can be further improved. The average particle size of the silica nanoparticles is from 2 nm to 1 µm, but a preferred average particle size is preferably from 5 nm to 500 nm. If the average particle size is less than 2 nm, handling, or the process of mixing and dispersion becomes difficult. If the average particle size is larger than 500 nm, the particles are likely to settle, and transparency may be deteriorated. The shape of the silica nanoparticles is not particularly limited, and any of those having a spherical shape, a plate shape, a layered shape, a pillar shape, a fiber shape and the like can be used. Among these, spherical particles are preferred from the viewpoint of dispersibility. As the silica nanoparticles, commercially available products such as Snowtex (Nissan Chemical Industries, Ltd.; product name), Organosilicasol (Nissan Chemical Industries, Ltd.; product name), Aerosil (Nippon Aerosil Co., Ltd.; product name), Sildex (Asahi Glass Co., Ltd.; product name), E220 (Nippon Silica Industrial Co., Ltd.; product name), Sylysia 470 (Fuji-Silysia Chemical Co., Ltd.; product name), and the like can be used. Among these, it is preferable to use silica sol dispersed in an organic solvent, generally known as colloidal silica, as the raw material. It is preferable to use these silica nanoparticles after preparing them as a dispersion in the silane compound of the component (D). To obtain the nanoparticles in this state, a method of mixing colloidal silica which is dispersed in a solvent such as methanol or the like, with the silane compound, and distilling off the methanol using a rotary evaporator. The content of the component (H) is usually 10 parts by weight or less, and preferably 0.01 to 10 parts by weight, based on the total of the components (A) to (D). If the amount of addition is less than 0.01 parts by weight, the effects may not be fully expected. If the amount of addition is more than 10 parts by weight, the viscosity of the solution may increase, or the storage stability may not be maintained.

For the composition of the invention, the viscosity of the composition measured as the Type E viscosity at 25° C. is preferably 1 to 500 mPa·s, more preferably 2 to 100 mPa·s, and still more preferably 5 to 50 mPa·s. When the viscosity is within the above-described range, excellent handlability can be obtained.

A cationic polymerizable compound other than the component (A) may also be added in an amount of 5 parts by weight or less based on 100 parts by weight of the composition of the invention. Specific examples thereof include monofunctional (methyl)glycidyl ether compounds such as 2-ethylexyl (methyl)glycidyl ether, 2-ethylhexyl diglycol (methyl)glycidyl ether, and the like; oxetanyl group-containing compounds such as 3-ethyl-3-(2-ethylhexyloxymethyl) oxetane, di[1-ethyl(3-oxetanyl)]methyl ether, and the like; fluorine-containing compounds represented by Formulas (39) and (40); and the like.

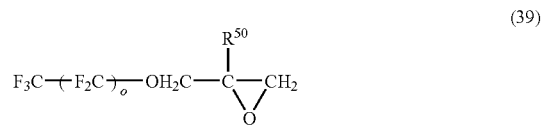

(39)

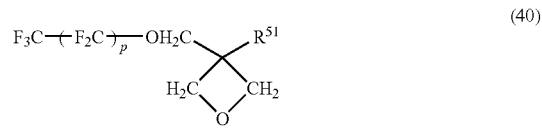

(40)

wherein $R^{50}$ represents hydrogen or a methyl group; $R^{51}$ represents a methyl group or an ethyl group; and o and peach independently represent an integer from 0 or 1 to 10.

A chain aliphatic polyol or chain aliphatic polyether polyol, to which (methyl)glycidyl ether groups are not attached, may also be added in an amount of 5 parts by weight or less based on 100 parts by weight of the composition of the invention. For example, the above-described compounds represented by the Formulas (9) to (15) may be mentioned.

A silane coupling agent may also be added in an amount of 5 parts by weight or less based on 100 parts by weight of the composition of the invention. Specific examples thereof include trifunctional silanes such as 3-chloropropyltrimethoxysilane, vinyltrimethoxysilane, 3-methacryloyloxypropyltrimethoxysilane, 2-(3,4-epoxycyclohexyl)ethyltrimethoxysilane, 3-glycidyloxypropyltrimethoxysilane, 3-mercaptopropyltrimethoxysilane, 3-aminopropyltrimethoxysilane, N-2-(aminoethyl)-3-aminopropyltrimethoxysilane, 3-ureidopropyltrimethoxysilane, 3-cyanopropyltrimethoxysilane, 3-morpholinopropyltrimethoxysilane, N-phenylaminopropyltrimethoxysilane, and the like; and bifunctional silanes, namely, bifunctional silanes having a part of the aforementioned trifunctional silanes substituted with alkyl groups, phenyl groups, vinyl groups or the like, for example, dimethyldimethoxysilane, phenylmethyldimethoxysilane, vinylmethyldimethoxysilane, 3-chloropropylmethyldimethoxysilane, 3-glycidoxypropylmethyldiethoxysilane, and the like.

Also, a photoresistant stabilizer, organic or inorganic dyes or colorants may also be added in an amount of 5 parts by weight or less based on 100 parts by weight of the composition of the invention.

Within the scope of not impairing the performance, a (meth)acryl monomer may be blended in an amount of 5 parts by weight or less based on 100 parts by weight of the composition of the invention. Specific examples thereof include isoamyl(meth)acrylate, lauryl(meth)acrylate, stearyl(meth)acrylate, butoxyethyl(meth)acrylate, ethoxy-diethylene glycol(meth)acrylate, methoxy-triethylene glycol(meth)acrylate, methoxy-polyethylene glycol(meth)acrylate, methoxydipropylene glycol(meth)acrylate, methoxy-diethylene glycol(meth)acrylate, phenoxyethyl(meth)acrylate, phenoxy-polyethylene glycol(meth)acrylate, tetrahydrofurfuryl(meth)acrylate, isobonyl(meth)acrylate, 2-hydroxyethyl(meth)acrylate, 2-hydroxypropyl(meth)acrylate, 2-hydroxy-3-phenoxypropyl(meth)acrylate, (meth)acrylic acid, glycidyl(meth)acrylate, 2-(meth)acryloyloxyethyl succinate, 2-(meth)acryloyloxyethyl phthalate, isooctyl(meth)acrylate, isomyristyl(meth)acrylate, 2-hydroxybutyl(meth)acrylate, methyl(meth)acrylate, ethyl(meth)acrylate, n-butyl(meth) acrylate, isobutyl(meth)acrylate, cyclohexyl methacrylate, benzyl(meth)acrylate, (meth)acryloylmorpholine, perfluorooctyl(meth)acrylate, trifluoroethyl(meth)acrylate, triethylene glycol di(meth)acrylate, polyethylene glycol di(meth) acrylate, neopentyl glycol di(meth)acrylate, 1,6-hexanediol di(meth)acrylate, 1,9-nonanediol di(meth)acrylate, dimethyloltricyclodecane di(meth)acrylate trimethylolpropane tri (meth)acrylate, ethylene oxide-modified trimethylolpropane tri(meth)acrylate, pentaerythritol tri(meth)acrylate, pentaerythritol tetra(meth)acrylate, dipentaerythritol hexa(meth) acrylate, bisphenol A diglycidyl ether(meth)acrylate adducts, 1,1,3,3,5,5-hexa((meth)acryloxy)cyclotriphosphogene, 1,1,3,3,5,5-hexa((meth)acryloxyethyloxy)cyclotriphosphogene, and the like.

Within the scope of not impairing the performance, other resin components, specifically polyurethane resin, polyester resin, polyether resin, polystyrene resin, acryl resin and the like may be added in an amount of 5 parts by weight or less based on 100 parts by weight of the composition of the invention.

Filler, specifically titania, zirconia, talc, polymer particles and the like may also be added to the composition of the invention.

In addition, in the case of adding a solvent to the composition of the invention, lower alcohols such as methyl alcohol, ethyl alcohol, isopropyl alcohol and the like; dimethylformamide, N,N'-dimethylacetamide, N-methyl-2-pyrrolidone, methylcellosolve, ethylcellosolve, butylcellosolve, ethylene glycol, tetrahydrofuran, dioxane, toluene and the like may be used.

[Method of Preparing the Composition]

The preparation is not particularly limited, and it may be carried out by any known method. An example of the methods is as follows. First, desired amounts of the components (A) to (D) are mixed in an opaque brown glass vessel or in a polymer vessel, and the mixture is warmed (approximately 50° C. or below) as necessary, and mixed completely. While the mixture is at room temperature (23° C.), the components (E), (F) and (G), and optionally other components as necessary, are added to the mixture, and the formed mixture is sufficiently mixed. The mixture is further sufficiently settled and deaerated to obtain the final composition. Herein, mixing was performed using a magnetic stirrer or an agitator, but it is preferable to select a mixer, a shaker, a triple-roll or the like in accordance with the amount or the viscosity of the composition.

[Coating Method, Curing Method]

In the case of coating on a substrate, methods such as dip coating, spin coating, spray coating and the like may be used. The thickness of the coating is 0.01 to 100 μm, preferably 0.1 to 20 μm, and more preferably 1 to 5 μm. If the thickness is smaller than 0.01 μm, good hardcoat performance may not be observed. If the thickness is larger than 100 μm, plane smoothness of the coating may not be obtained. As the ultraviolet light source needed in photopolymerization, various mercury lamps of low pressure, high pressure and ultrahigh pressure, chemical lamps, metal halide lamps, ultraviolet laser and the like can be used.

[Evaluation Methods for Composition and Cured Film]

Evaluation of adhesion of the hardcoat:

The JIS-K5600-5-6: 1999 adhesion test (crosscut test) may be used. Preferably, the condition after curing by photopolymerization is of Class 0 (the edges of cuts are complete and smooth so that there is no peeled-off grid meshes), or of Class 1 (slight peeling-off of the coating at the cross points of cuts. The portion of the crosscuts under the influence occupies obviously no more than 5%). Also, the condition after the below-described weather resistance test is of Class 0 to Class 2 (the coating is peeled off along the edges of cuts and/or at the cross points. The portion of crosscuts under the influence occupies obviously more than 5% but no more than 15%).

Scratch resistance test:

A test of rubbing with steel wool (#0000) may be used, and preferably, no scratch is observed after 10 shuttling movement under a load of 500 g.

Ultraviolet curability

An ultraviolet light of 365 nm is measured, and the composition is cured with a cumulative energy of 2 J/cm$^2$ or less, and particularly preferably 1 J/cm$^2$ or less.

Weather resistance: A pseudo exposure is performed using a sunshine weather meter (light source: a carbon arc lamp or a xenon lamp/with tailwater). No peeling off is observed in the above-described adhesion test after an exposure of 30 hr.

Evaluation of appearance:

The evaluation is performed by viewing with naked eyes, and it is confirmed that defects such as eye holes, discontinuities, non-smoothness, generation of an orange peel texture, and the like are not observed.

Viscosity of composition:

The viscosity is measured as the Type E viscosity at 25° C., and the value is preferably 1 to 500 mPa·s, more preferably 2 to 100 mPa·s, and still more preferably 5 to 50 mPa·s.

Storage stability of composition:

The stability of the composition is maintained preferably for 1 month or longer under room temperature storage and 6months or longer under refrigerated (4° C.) storage, and more preferably for 6 months or longer under room temperature storage and 1 year or longer under refrigerated (4° C.) storage.

[Use of Composition of the Invention]

The composition of the invention exhibits excellent scratch resistance and adhesion, and very high transparency, when applied and cured on a substrate, and thus, the composition can be used in a wide range application. In particular, the composition can be used for thiourethane resins and thioepoxy resins, for which there have been no desirable materials from the viewpoint of adhesion.

Hereinafter, the present invention will be described in more detail with reference to Preparation Examples, Interpretation Examples and Examples, but the invention is not limited to these Preparation Examples, Interpretation Examples and Examples.

EXAMPLES

<Preparation and Evaluation of a Hard Coating Agent Containing Composition of the Invention>

Preparation Example 1

<Preparation of Thiourethane Resin (1)>

3 6.4 g of m-xylylenediisocyanate represented by Formula (41), 33.6 g of 1,2-bis(2-mercaptoethyl)thio-3-mercaptopropane represented by Formula (42), 0.01 g of dibutyltin dichloride, and 0.07 g of ZelecUN (STEPAN Company) as an internal releasing agent were added and stirred, and the mixture was defoamed under reduced pressure for 1 hour. The mixture was filtered through a 1-μm Teflon (registered trademark) filter, and then was introduced into a forming mold including a glass mold and a gasket. While slowly heating this mold from 40° C. to 120° C., polymerization was performed for 20 hours. After completion of the polymerization, the reaction mixture was slowly cooled, and the resin was removed from the mold. The obtained resin was subjected to annealing at 120° C. for 3 hours, to obtain a resin plate (thickness: 5 mm).

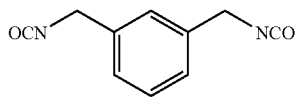

(41)

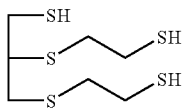

(42)

Preparation Example 2

<Preparation of Thiourethane Resin (2)>

37.6 g of m-xylylenediisocyanate, 33.6 g of polythiol represented by Formula (43), 0.01 g of dibutyltin dichloride, and 0.07 g of ZelecUN (STEPAN Company) as an internal releasing agent were added and stirred, and the mixture was defoamed under reduced pressure for 1 hour. The mixture was filtered through a 1-μm Teflon (registered trademark) filter, and then was introduced into a forming mold including a glass mold and a gasket. While slowly heating this mold from 40° C. to 120° C., polymerization was performed for 20 hours. After completion of the polymerization, the reaction mixture was slowly cooled, and the resin was removed from the mold. The obtained resin was subjected to annealing at 120° C. for 3 hours, to obtain a resin plate (thickness: 5 mm).

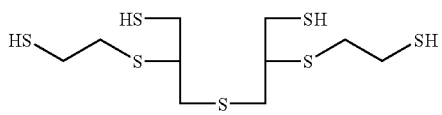

(43)

Preparation Example 3

<Preparation of Thioepoxy Resin (1)>

70.0 g of bis(2,3-epithiopropyl)disulfide represented by Formula (44), 0.014 g of N,N-dimethylcyclohexylamine, and 0.07 g of N,N-dicyclohexylmethylamine were added and stirred, and the mixture was defoamed under reduced pressure for 1 hour. The mixture was filtered through a 3-μm Teflon (registered trademark) filter, and then was introduced into a forming mold including a glass mold and a gasket, over 4 hours. This mold was kept warm at 30° C. for 10 hours, then the mixture was slowly heated from 30° C. to 80° C., and polymerization was performed for 20 hours. After completion of the polymerization, the reaction mixture was slowly cooled, and the resin was removed from the mold. The obtained resin was subjected to annealing at 120° C. for 3 hours, to obtain a resin plate (thickness: 5 mm).

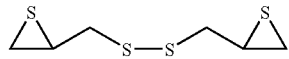

(44)

Preparation Example 4

<Preparation of Thioepoxy Resin (2)>

70.0 g of bis(β-epithiopropyl)sulfide represented by Formula (45) and 0.35 g of tributylamine were added and stirred, and the mixture was defoamed under reduced pressure for 1 hour. The mixture was filtered through a 3-μm Teflon (registered trademark) filter, and then was introduced into a forming mold over 4 hours. This mold was kept warm at 30° C. for 10 hours, then the mixture was slowly heated from 30° C. to 120° C., and polymerization was performed for 20 hours. After completion of the polymerization, the reaction mixture was slowly cooled, and the resin was removed from the mold. The obtained resin was subjected to annealing at 120° C. for 3 hours, to obtain a resin plate (thickness: 5 mm).

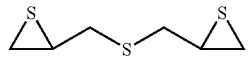

(45)

In addition, the resin plates produced in Preparation Examples 1 to 4 were immersed in a 1 wt % aqueous solution of NaOH for 20 minutes, then washed sufficiently with water, and dried at room temperature, in order to eliminate the internal releasing agent adhered on the surface before performing the evaluations to be described later.

Preparation Example 5

Octa[2-(Butoxymethyl)oxirane-dimethylsiloxy]-silsesquioxane represented by Formula (46), which is a closed cage-structured silsesquioxane having a cationic polymerizable group represented by Formula (31), as the component (B), was prepared in advance by the following method.

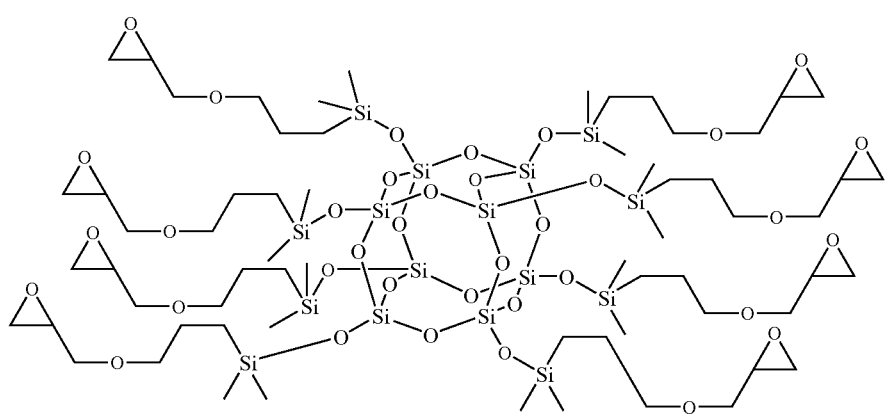

(46)

10 g (9.84 nmol) of octadimethylsiloxy-silsesquioxane represented by Formula (47) (a reagent from Sigma-Aldrich Co.) was dissolved in dry toluene under a moisture-proof environment, and then 10 ml (78.72 mmol) of allyl glycidyl ether (a reagent from Sigma-Aldrich Co.) was added thereto dropwise with stirring. Then, 10 ml of a 2 mM solution of a platinum-1,3-divinyl-1,1,3,3-tetramethyldisiloxane complex (O[Si(CH$_3$)$_2$CH=CH$_2$]Pt) (diluted in xylene) as a catalyst was further added dropwise to the mixture. The mixture was heated to 50° C. under a nitrogen stream; and the reaction was carried out. The reaction was continued for 24 hours or longer, and the reaction was terminated after confirming that the absorption of Si—H (near 2250 cm$^{-1}$) disappeared in FTIR. Thereafter, toluene was distilled off using a rotary evaporator. About 17 g of viscous but transparent octa[2-(butoxymethyl)oxirane-dimethylsiloxy]-silsesquioxane was obtained.

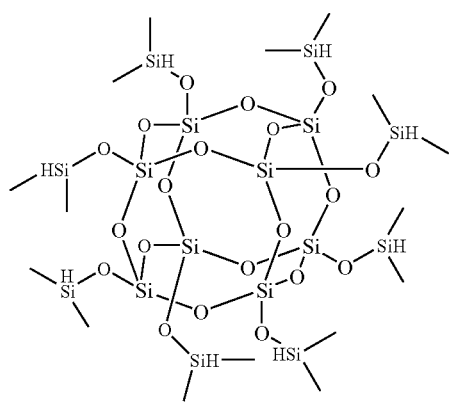

(47)

Interpretation Example 1

<Interpretation of octa[2-(butoxymethyl)oxirane-dimethylsiloxy]-silsesquioxane Synthesized in Preparation Example 5>

Figure 2:
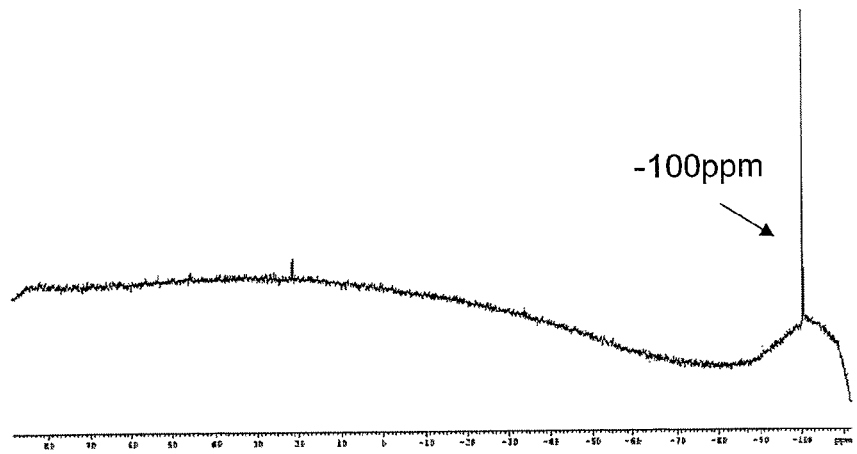
FIG. 2 shows the $^{29}$Si-NMR measurement results of octa[2-(butoxymethyl)oxirane-dimethylsiloxy]-silsesquioxane.

The FTIR measurement results for octa[2-(butoxymethyl)oxirane-dimethylsiloxy]-silsesquioxane are shown in FIG. 1. Peaks characteristic to the Si—O—Si bonding were observed at 1090 cm$^{-1}$ and 1035 cm$^{-1}$. A peak characteristic to Si—OH near 3300 cm$^{-1}$ was not observed. The $^{29}$Si-NMR measurement results are shown in FIG. 2. A very sharp peak was observed near –100 ppm. This sharp peak is believed to be originating from a regular structure, that is, the cage-shaped-like silsesquioxane structure. The molecular weight was investigated by GPC, and was found to be Mn=2110 and Mw=2270 (Mw/Mn=1.07), which are approximately consistent with the value 1930 of the molecular weight calculated from the Formula (46). From these, it was confirmed that octa[2-(butoxymethyl)oxirane-dimethylsiloxy]-silsesquioxane having a closed cage-shaped-like structure was obtained by the Preparation Example 5.

Interpretation Example 2

<Interpretation of Silsesquioxane Having Oxetanyl Group: OX—SQ-H>

Figure 3:
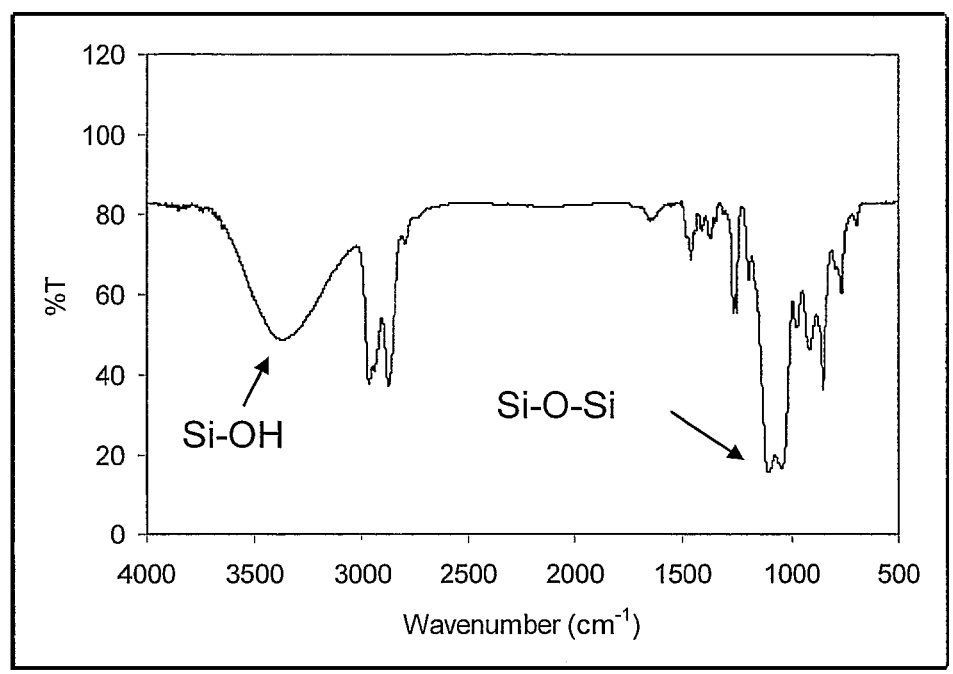
FIG. 3 shows the FTIR measurement results of OX—SQ-H.
Figure 4:
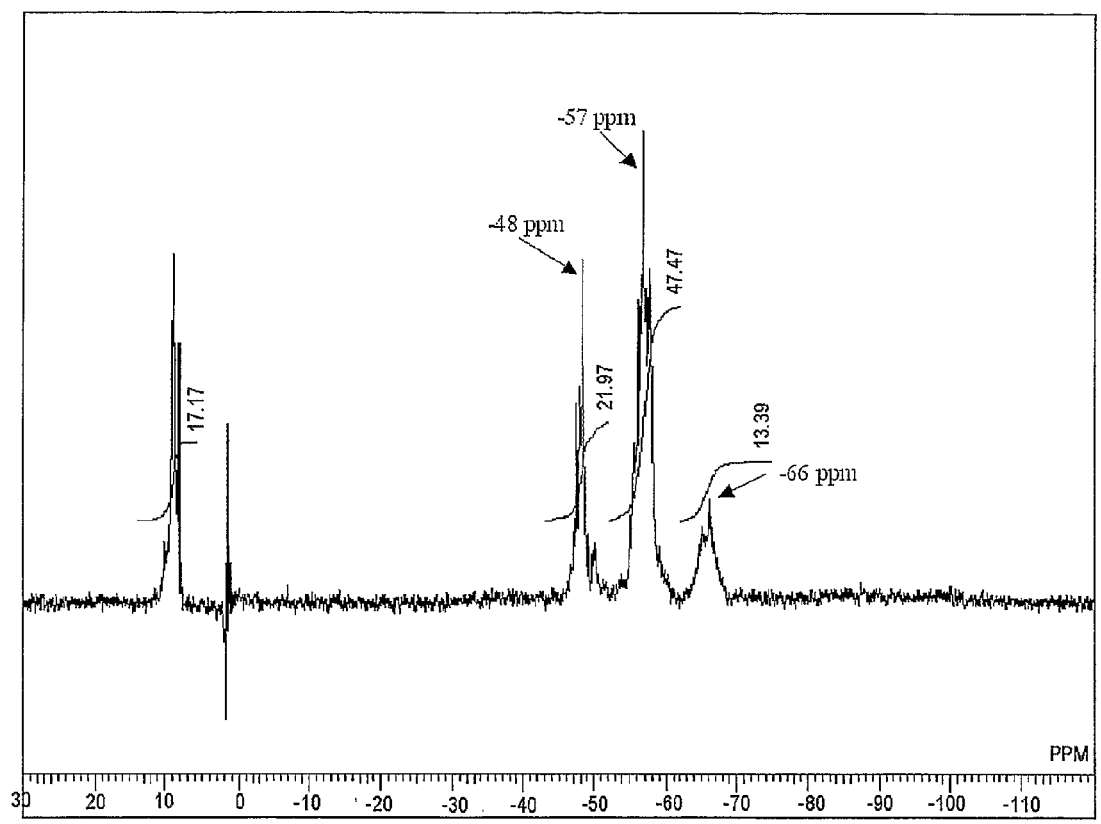
FIG. 4 shows the $^{29}$Si-NMR measurement results of OX—SQ-H.

To specify the structure of silsesquioxane having an oxetanyl group: OX—SQ-H (Toagosei Co., Ltd.), an interpretation was conducted by the following method. The FTIR measurement results of OX—SQ-H are shown in FIG. 3. Peaks characteristic to the Si—O—Si bonding were observed at 1090 cm$^{-1}$ and 1035 cm$^{-1}$, while a peak characteristic to Si—OH was observed at 3335 cm$^{-1}$. The $^{29}$Si-NMR measurement results are shown in FIG. 4. Very sharp peaks ware observed near –48 ppm, –57 ppm, and –66 ppm. These sharp peaks are believed to be originating from a regular structure, that is, cage-shaped-like silsesquioxane structure. From the above interpretation results, it was believed that OX—SQ-H includes at least a partially open type cage-shaped-like silsesquioxane having a silanol group, or a mixture of a closed type cage-shaped-like silsesquioxane and a partially open type cage-shaped-like silsesquioxane having a silanol group.

Preparation Example 6

A partial condensate of 3-glycidoxypropyltrimethoxysilane as the component (D) was prepared in advance by the following method. 236 g (1 mol) of 3-glycidoxypropyltrimethoxysilane and 27 g (15 mol) of ion exchanged water were mixed, 0.5 ml of a 1% solution of hydrochloric acid was added to the mixture, and the resulting mixture was stirred at room temperature for 24 hours. 100 g of dry toluene was further added to the mixture, and toluene and water were completely removed by an evaporator to obtain a partial condensate of 3-glycidoxypropyltrimethoxysilane.

Preparation Example 7

Silica nanoparticles dispersed in 3-glycidoxypropyltrimethoxysilane as the component (H) was prepared in advance by the following method. 33.3 g of colloidal silica (Organosilicasol, manufactured by Nissan Chemical Industries, Ltd.; particle size of silica: 5 to 10 nm, solids content by weight: 30% by weight) dispersed in methanol was further mixed with 33.3 g of methanol to dilute the silica to 15% by weight. 10.0 g of 3-glycidoxypropyltrimethoxysilane was added thereto and uniformly stirred. The mixture was heated to 90° C., and the solution was refluxed for 20 minutes. Thereafter, the solution was awaited to return to the room temperature, and then 46.7 g of 3-glycidoxypropyltrimethoxysilane was further added thereto. Methanol was distilled off using a rotary evaporator, and a solution having silica nanoparticles dispersed in 3-glycidoxypropyltrimethoxysilane in a proportion of 15% by weight was obtained.

Example 1

13.6 g of trimethylolpropanetriglycidyl ether (Epolite 100MF manufactured by Kyoeisha Co., Ltd; product name) as the component (A), 18.2 g of silsesquioxane having an oxetanyl group: OX—SQ-H (Toagosei Co., Ltd.) as the component (B), 4.5 g of M Silicate 51 (Tama Chemicals Co., Ltd.) as the component (C), 50 g of 3-glycidoxypropyltrimethoxysilane and 13.7 g of a partial condensate of 3-glycidoxypropyltrimethoxysilane prepared in advance in Preparation Example 6, both as the component (D) (63.7 g in total); 4.5 g of SP-150 (Asahi Denka Co., Ltd.) as the component (E); 3.0 g of 2,2',4,4'-tetrahydroxybenzophenone which is a 2-hydroxybenzophenone-based ultraviolet absorber, 0.75 g of TINUVIN 400 (Ciba Specialty Chemicals, Inc.) which is a triazine-based ultraviolet absorber, and 0.75 g of TINUVIN 1130 (Ciba Specialty Chemicals, Inc.) which is a benzotriazole-based ultraviolet absorber, all as the component (F) (the absorption spectra of the respective ultraviolet absorbers are shown in FIG. 3); and 1.8 g of a compound in which silsesquioxane is bound to dimethylsilicone: OX—SQ-SI20 (Toagosei Co., Ltd.) as the component (G) were each precisely weighed in a brown bottle, and sufficiently stirred. The mixture of the above components was a transparent liquid with no turbidity. The mixture was further sufficiently settled and deaerated at room temperature (23° C.) to yield a coating composition, which was evaluated by the following methods.

Example 2

13.6 g of trimethylolpropanetriglycidyl ether as the component (A), a mixture of 13.6 g of OX—SQ-H and 4.6 g of octa[2-(butoxymethyl) oxirane-dimethylsiloxy]-silsesquioxane prepared in advance in Preparation Example 5 as the component (B) (20 g in total); 9.1 g of M Silicate 51 as the component (C), a mixture of 50 g of 3-glycidoxypropyltrimethoxysilane and 9.1 g of the previously prepared partial condensate of 3-glycidoxypropyltrimethoxysilane as the component (D) (59.1 g in total); 4.5 g of SP-150 as the component (E); 3.0 g of 2,2',4,4'-tetrahydroxybenzophenone which is a 2-hydroxybenzophenone-based ultraviolet absorber, 0.75 g of TINUVIN 400 which is a triazine-based ultraviolet absorber, and 0.75 g of TINUVIN 1130 which is a benzotriazole-based ultraviolet absorber, all as the component (F); and 1.8 g of OX—SQ-SI20 as the component (G) were each precisely weighed in a brown bottle, and were sufficiently stirred. The mixture of the above components was a transparent liquid with no turbidity. The mixture was further sufficiently settled and deaerated at room temperature (23° C.) to yield a coating composition, which was evaluated by the following methods.

Example 3

13.6 g of trimethylolpropanetriglycidyl ether as the component (A), 18.2 g of oxetanylsilsesquioxane: OX—SQ-H as the component (B), 4.5 g of M Silicate 51 as the component (C), a mixture of 36.4 g of 3-glycidoxypropyltrimethoxysilane, and 13.7 g of a partial condensate of 3-glycidoxypropyltrimethoxysilane as the component (D) (50 g in total); 27.3 g of the silica dispersion prepared in advance in Preparation Example 7 as the component (H) (the amount of silica being 4.1 g); 5.0 g of SP-150 as the component (E); 3.0 g of 2,2',4,4'-tetrahydroxybenzophenone which is a 2-hydroxybenzophenone-based ultraviolet absorber, 0.75 g of TINUVIN 400 which is a triazine-based ultraviolet absorber, and 0.75 g of TINUVIN 1130 which is a benzotriazole-based ultraviolet absorber, all as the component (F); and 1.8 g of OX—SQ-SI20 as the component (G), were each precisely weighed into a brown bottle and sufficiently stirred. The mixture of the above components was a transparent liquid with no turbidity. The mixture was further sufficiently settled and deaerated at room temperature (23° C.) to yield a coating composition, which was evaluated by the following methods.

Examples 4 to 14

Coating compositions having the compositions indicated in Table 1 were prepared in the same manner as in Examples 1 to 3, and were evaluated by the methods described below.

Example 15

A coating composition having the composition indicated in Table 1 was prepared in the same manner as in Example 1, except that no ultraviolet absorbers of the component (F) were added. The composition was evaluated by the methods described below.

Comparative Example 1

13. 6 g of bisphenol A diglycidyl ether as an aromatic diglycidyl ether replacing the Component (A), 18.2 g of OX—SQ-H as the component (B), 4.5 g of M Silicate 51 as the component (C), 50 g of 3-glycidoxypropyltrimethoxysilane, and 13.7 g of a partial condensate of 3-glycidoxypropyltrimethoxysilane, both as the component (D) (63.7 g in total); 4.5 g of SP-250 as the component (E); 3.0 g of 2,2',4, 4'-tetrahydroxybenzophenone which is a 2-hydroxybenzophenone-based ultraviolet absorber, 0.75 g of TINUVIN 400 which is a triazine-based ultraviolet absorber, and 0.75 g of TINUVIN 1130 which is a benzotriazole-based ultraviolet absorber, all as the component (F); and 1.8 g of a compound in which silsesquioxane is bound to dimethylsilicone: OX—SQ-SI20 as the component (G), were each precisely weighed into a brown bottle, and sufficiently stirred. The mixture of the above components was a transparent liquid with no turbidity. The mixture was further sufficiently settled and deaerated at room temperature (23° C.) to yield a coating composition. The composition was evaluated by the methods described below.

Comparative Example 2

13.6 g of 2-(3,4-epoxycyclohexyl) carboxylate as an alicyclic epoxy compound replacing the component (A), 18.2 g of OX—SQ-H as the component (B), 4.5 g of M Silicate 51 as the component (C), 50 g of 3-glycidoxypropyltrimethoxysilane and 13.7 g of a partial condensate of 3-glycidoxypropyltrimethoxysilane, both as the component (D) (63.7 g in total); 4.5 g of SP-150 as the component (E); 3.0 g of 2,2',4, 4'-tetrahydroxybenzophenone which is a 2-hydroxybenzophenone-based ultraviolet absorber, 0.75 g of TINUVIN 400 which is a triazine-based ultraviolet absorber, and 0.75 g of TINUVIN 1130 which is a benzotriazole-based ultraviolet absorber, all as the component (F); and 1.8 g of a compound in which silsesquioxane is bound to dimethylsilicone: OX—SQ-SI20 as the component (G), were each precisely weighed into a brown bottle, and were sufficiently stirred. The mixture of the above components was a transparent liquid with no turbidity. The mixture was further sufficiently settled and deaerated at room temperature (23° C.) to yield a coating composition. The composition was evaluated by the methods described below.

Comparative Example 3

A coating composition was prepared as indicated in Table 2 by precisely weighing into a brown bottle the components (B) and the components (C) to (G) in order, without adding the component (A), and sufficiently stirring. The composition was evaluated by the methods described below.

Comparative Example 4

A coating composition was prepared as indicated in Table 2 by precisely weighing into a brown bottle the components (A) and the components (C) to (E) in order, without adding the component (B), and sufficiently stirring. The composition was evaluated by the methods described below.

Comparative Example 5

A coating composition was prepared as indicated in Table 2 by precisely weighing into a brown bottle the components (A) and (B), and the components (D) to (G) in order, without adding the component (C), and sufficiently stirring. The composition was evaluated by the methods described below.

Comparative Example 6

A coating composition was prepared as indicated in Table 2 by precisely weighing into a brown bottle the components (A) and (B), and the components (C), (E) to (G) in order, without adding the component (D), and sufficiently stirring. The composition was evaluated by the methods described below.

Comparative Example 7

60.0 g of trimethylolpropanetriglycidyl ether as the component (A), 10.0 g of OX—SQ-H as the component (B), 1.7 g of M Silicate 51 as the component (C), 20.0 g of 3-glycidoxypropyltrimethoxysilane, and 5.0 g of a partial condensate of 3-glycidoxypropyltrimethoxysilane, both as the component (D) (25.0 g in total); 4.5 g of SP-150 as the component (E); 3.0 g of 2,2',4,4'-tetrahydroxybenzophenone which is a 2-hydroxybenzophenone-based ultraviolet absorber, 0.75 g of TINUVIN 400 which is a triazine-based ultraviolet absorber, and 0.75 g of TINUVIN 1130 which is a benzotriazole-based ultraviolet absorber, all as the component (F); and 1.8 g of a compound in which silsesquioxane is bound to dimethylsilicone: OX—SQ-SI20 as the component (G), were each precisely weighed into a brown bottle, and were sufficiently stirred. Thus, a coating composition was prepared and evaluated by the methods described below.

Comparative Example 8

A coating composition was prepared as an acrylic coating composition, by precisely weighing into a brown bottle 50 g of dipentaerythritol triacrylate (DPHA), 20 g of pentaerythritol triacrylate, 30 g of 1,6-hexanediol diacrylate (HDDA), 3 g of Darocur 1173 (Ciba Specialty Chemicals, Inc.) as a radical photopolymerization initiator, and 0.03 g each of BYK-UV3500 and BYK-UV3510 (BYK-Chemie GmbH) in order, and sufficiently stirring the mixture. The composition was evaluated by the methods described below.

Comparative Example 9

A coating composition was prepared as an acrylic coating composition, by precisely weighing into a brown bottle 20 g of pentaerythritol triacrylate, 80 g of 1,6-hexanediol diacrylate (HDDA), 3 g of Darocur 1173 (Ciba Specialty Chemicals, Inc.) as a radical photopolymerization initiator, and 0.03 g each of BYK-UV3500 and BYK-UV3510 (BYK-Chemie GmbH) in order, and sufficiently stirring the mixture. The composition was evaluated by the methods described below.

The evaluation of the hard coating agent was performed as follows.

Each of the coating compositions of Examples 1 to 15 and Comparative Examples 1 to 9 was applied on the resin plates of Preparation Examples 1 to 4 by spin coating, and was irradiated with a 160 W/cm type high pressure mercury lamp (light intensity at a wavelength of 365 nm: 170 mW/cm$^2$) to form a cured film (the curing was performed in the atmosphere). These samples were cured by storing in a place at a temperature of 23° C. and a relative humidity of 40 to 50%. Then, the film thickness was measured with a stylus type surface profiler (DekTakIII, manufactured by Veeco Instruments, Inc.).

[1] Viscosity of Composition

The viscosities of the compositions of Examples 1 to 15 and Comparative Examples 1 to 9 were measured with a Type E viscometer (Tokyo Keiki Co., Ltd.). The results are presented in Table 1 and Table 2.

[2] Storage Stability of Composition

The compositions of Examples 1 to 15 and Comparative Examples 1 to 9 were respectively placed in brown sample bottles and completely sealed. The compositions were stored by standing still in a dark room at room temperature for 1 month and then at 4° C. for 6 months, and were examined for any changes.

A: No gelation of the liquid, and no changes in the viscosity

B: No gelation of the liquid, but some changes in the viscosity

C: Gelation of the liquid

The results are presented in Table 1 and Table 2, and all of the compositions showed the result A, that is, no gelation of the liquid and no changes in the viscosity, after being stored at room temperature for 1 month and at 4° C. for 6 months.

[3] Film Forming Properties (Spin Coat Smoothness)

The compositions of Examples 1 to 15 and Comparative Examples 1 to 9 were applied on the resin plate formed in Preparation Example 1 by spin coating at a rate ranging from 0 to 3000 rpm (rotation time: 60 sec) to form films, and the formed films were evaluated as follows.

A: The film obtained after coating and curing is smooth, and shows no defects such as eye holes, discontinuities, generation of an orange peel texture, and the like. The film thickness is from 1 μm to 5 μm.

B: The film obtained after coating and curing shows no defects such as eye holes, discontinuities, generation of an orange peel texture, and the like, and the film thickness is from 1 μm to 5 μm. However, the smoothness is slightly poor.

C: The film cannot be formed to a thickness from 1 μm to 5 μm, or is not smooth after curing. Defects in the appearance such as eye holes, discontinuities, generation of an orange peel texture, and the like are recognized.

The results are presented in Tables 1 and 2.

[4] Curability

Curability was examined after the evaluation of film forming properties, by irradiating using a high pressure mercury lamp of 160 W/cm (no ozone cut-off). For the energy of irradiation, the cumulative amount of irradiation of ultraviolet ray of 365 nm was measured. For the confirmation of curing, the film was cured by storing in a place at a temperature of 23° C. and a relative humidity of 40 to 50% for 1 hour, after UV irradiation, and the case where no tackiness is observed on the film surface, and no peeling-off is observed even after strongly scratching with fingernails, is considered as complete curing.

AA: Complete curing with an amount of irradiation of 1 J/cm$^2$ or less

A: Complete curing with an amount of irradiation of 2 J/cm$^2$

B: No complete curing with an amount of irradiation of 2 J/cm$^2$ or less

The results are presented in Tables 1 and 2.

[5] Adhesion Test

Samples prepared by applying the compositions of Examples 1 to 15 and Comparative Examples 1 to 9 on the resin plates of Preparation Examples 1 to 4, were subjected to the JIS-K5600 adhesion test (crosscut test) First, 25 meshes of 1 mm$^2$ were formed by inserting cut lines on the samples at an interval of 1 mm using an equal-interval spacer and a cutter knife. Furthermore, a transparent, low pressure adhesive tape was attached on the samples and peeled by pulling at an angle of 60°, and the meshes remaining on the coat film were counted.

The evaluation was graded such that the case of Class 0 was grade AA, the cases of Classes 1 to 2 were grade A, the case of Class 3 was grade B, and the cases of Classes 4 and 5 were grade C.

Class 0: The edges of the cuts are completely smooth, and no peeling-off is observed in any of the meshes.

Class 1: Slight peeling-off of the coating observed at the cross points of the cuts. The affected area in the crosscut part obviously does not exceed 5%.

Class 2: Peeling-off of the coating is observed along the edges of the cuts, and/or at the cross points. The affected area in the crosscut part obviously exceeds 10% but does not exceed 15%.

Class 3: Major peeling-off is occurring partially or fully along the edges of the cuts, and/or peeling-off is occurring partially or fully in various parts of the meshes. The affected area in the crosscut part obviously exceeds 15% but does not exceed 35%.

Class 4: Major peeling-off is occurring partially or fully along the edges of the cuts, and/or peeling-off is occurring partially or fully in various parts of the meshes. The affected area in the crosscut part obviously exceeds 35% but does not exceed 65%.

Class 5: The extent of peeling-off is higher than Class 4.

The results are presented in Table 3.

[6] Scratch Resistance Test

For the sample obtained by forming a film with each of the compositions of Examples 1 to 15 and Comparative Examples 1 to 9 on the resin plate of Preparation Example 1, the film surfaces were abraded with steel wool of #0000 (Nihon Steelwool Co., Ltd.) under a load of 1000 g or 500 g by shuttling 10 times, and the degree of scratching was determined as follows with eye observance.

AA: No scratches in the area abraded under a load of 1000 g.

A: No scratches in the area abraded under a load of 500 g.

B: 1 to 10 scratches in the area abraded under a load of 500 g.

C: 10 to 30 scratches in the area abraded under a load of 500 g.

D: Numerous scratches in the area abraded under a load of 500 g.

The results are presented in Table 4.

[7] Transparency

For the samples obtained by forming films of the compositions of Examples 1 to 15 and Comparative Examples 1 to 9 on the resin plate of Preparative Example 1, the film appearance was observed with naked eyes, and the transmittance was measured for a region of from 400 nm to 600 nm using a film transmittance meter (Shimadzu UV2200).

A: A transmittance of 90% or higher in the region of from 400 nm to 600 nm

B: A transmittance of 80 to 90% in the region of from 400 nm to 600 nm

C: A transmittance of 80% or lower in the region of from 400 nm to 600 nm

The results are presented in Table 4.

[8] Weather Resistance

The samples prepared by forming films of the compositions of Examples 1 to 15 and Comparative Examples 1 to 9 respectively on the resin plate of Preparation Example 1, were exposed using a sunshine weather meter employing a carbon arc lamp and a sunshine weather meter employing a xenon lamp (both from Suga Test Instruments Co., Ltd.) for 30 hours, and then were examined for any changes in the adhesion. The adhesion was evaluated by the same method as described in the "[5] Adhesion test" section.

In addition, when a sample was found to be disqualified in the [5] adhesion test, the sample was not subjected to the present test.

[9] Hot Water Resistance

The samples prepared by forming films of the compositions of Examples 1 to 15 and Comparative Examples 1 to 9 respectively on the resin plate of Preparation Example 1, were immersed in hot water at 90° C. for 2 hours, and were examined for any changes in the external appearance.

A: No changes in the external appearance

B: Some changes such as swelling and the like observed in the film

C: Cracks observed in the film

The results are presented in Table 4.

TABLE 1

| | | | Example 1 | Example 2 | Example 3 | Example 4 | Example 5 | Example 6 | Example 7 | Example 8 |
|---|---|---|---|---|---|---|---|---|---|---|
| Composition | Component (A) | Glycerin diglycidyl ether | | | | | 13.6 | | | |
| | | Trimethylolpropanetriglycidyl ether | 13.6 | 13.6 | 13.6 | 13.6 | | | 13.6 | 13.6 |
| | | Propylene glycol diglycidyl ether | | | | | | 13.6 | | |
| | Component (B) | OX-SQ-H (Toagosei Co, Ltd.) | 18.2 | 13.6 | 18.2 | 13.6 | 18.2 | 18.2 | 18.2 | 18.2 |
| | | Octa[2-(butoxymethyl)oxirane-dimethylsiloxy]-silsesquioxane | | 4.6 | | 4.6 | | | | |
| | Component (C) | OX-SC (Oxetanyl silicate) | | | | | 4.5 | 4.5 | | |
| | | M Silicate 51 | 4.5 | 9.1 | 4.5 | 4.5 | | | 4.5 | 4.5 |
| | Component (D) | 3-Glycidoxypropyltrimethoxysilane | 50.0 | 50.0 | 36.4 | 36.4 | 50.0 | 50.0 | 50.0 | 50.0 |
| | | Partial condensate of 3-glycidoxypropyltrimethoxysilane | 13.7 | 9.1 | 13.7 | 13.7 | 13.7 | 13.7 | 13.7 | 13.7 |
| | Component (E) | SP-150 (Asahi Denka Co., Ltd.) | 4.5 | 4.5 | 5.0 | 5.0 | 4.5 | 4.5 | 4.5 | 4.5 |
| | Component (F) | 2,2',4,4'-Tetrahydroxybenzophenone (2-hydroxybenzophenone-based ultraviolet absorbor) | 3.0 | 3.0 | 3.0 | 3.0 | 3.0 | 3.0 | 4.0 | 5.0 |
| | | TINUVIN 400 (triazine-based ultraviolet absorbor) | 0.75 | 0.75 | 0.75 | 0.75 | 0.75 | 0.75 | 0.75 | 0.75 |
| | | TINUVIN 1130 (benzotriazole-based ultraviolet absorbor) | 0.75 | 0.75 | 0.75 | 0.75 | 0.75 | 0.75 | 0.75 | 0.75 |
| | Component (G) | OX-SQ-SI20 (Toagosei Co., Ltd.) | 1.8 | 1.8 | 1.8 | 1.8 | | | 1.8 | 1.8 |
| | | BYK-UV3500 (BYK-Chemie GmbH) | | | | | 0.16 | 0.16 | | |
| | | BYK-UV3510 (BYK-Chemie GmbH) | | | | | 0.16 | 0.16 | | |

TABLE 1-continued

|  |  |  |  |  |  |  |  |  |  |
|---|---|---|---|---|---|---|---|---|---|
|  | Component (H) | Silica nanoparticles + 3-glycidoxypropyl-trimethoxysilane (silica: 15% by weight) The weight of silica nanoparticles and the like indicated in brackets |  |  | 27.3 (4.1) | 27.3 (4.1) |  |  |  |
|  |  | (A) + (B) + (C) + (D) (parts by weight) | 100 | 100 | 86.4 | 86.4 | 100 | 100 | 100 | 100 |
|  |  | (A) + (B) + (C) + (D) + (E) + (F) + (G) + (H) (parts by weight) | 110.8 | 110.8 | 125 | 125 | 109.32 | 109.32 | 111.8 | 112.8 |
| Evaluation | [1] Viscosity (mPa·S) |  | 15 | 15 | 17 | 16 | 15 | 15 | 15 | 16 |
|  | [2] Storage stability |  | A | A | A | A | A | A | A | A |
|  | [3] Film forming properties (spin coat smoothness) |  | A | A | A | A | A | A | A | A |
|  | [4] Curability |  | AA | AA | AA | AA | AA | AA | AA | AA |

|  |  |  | Example 9 | Example 10 | Example 11 | Example 12 | Example 13 | Example 14 | Example. 15 |
|---|---|---|---|---|---|---|---|---|---|
| Composition | Component (A) | Glycerin diglycidyl ether Trimethylolpropanetriglycidyl ether Propylene glycol diglycidyl ether | 13.6 | 13.6 | 13.6 | 13.6 | 13.6 | 13.6 | 13.6 |
|  | Component (B) | OX-SQ-H (Toagosei Co, Ltd.) Octa[2-(butoxymethyl)oxirane-dimethylsiloxy]-silsesquioxane | 18.2 | 18.2 | 18.2 | 18.2 | 18.2 | 18.2 | 18.2 |
|  | Component (C) | OX-SC (Oxetanyl silicate) M Silicate 51 | 4.5 | 4.5 | 4.5 | 4.5 | 4.5 | 4.5 | 4.5 |
|  | Component (D) | 3-Glycidoxypropyltrimethoxysilane | 50.0 | 50.0 | 50.0 | 36.4 | 36.4 | 36.4 | 36.4 |
|  |  | Partial condensate of 3-glycidoxypropyltrimethoxysilane | 13.7 | 13.7 | 13.7 | 13.7 | 13.7 | 13.7 | 13.6 |
|  | Component (E) | SP-150 (Asahi Denka Co., Ltd.) | 4.5 | 4.5 | 4.5 | 4.5 | 4.5 | 4.5 | 4.5 |
|  | Component (F) | 2,2',4,4'-Tetrahydroxybenzophenone (2-hydroxybenzophenone-based ultraviolet absorbor) | 3.0 | 3.0 | 3.0 | 3.0 |  |  |  |
|  |  | TINUVIN 400 (triazine-based ultraviolet absorbor) | 1.5 |  | 0.75 | 0.75 | 0.75 | 1.5 |  |
|  |  | TINUVIN 1130 (benzotriazole-based ultraviolet absorbor) |  | 1.5 | 0.75 | 0.75 | 0.75 | 1.5 |  |
|  | Component (G) | OX-SQ-SI20(Toagosei Co., Ltd.) BYK-UV3500 (BYK-Chemie GmbH) BYK-UV3510 (BYK-Chemie GmbH) | 1.8 | 1.8 | 1.8 | 1.8 | 1.8 | 1.8 | 1.8 |
|  | Component (H) | Silica nanoparticles + 3-glycidoxypropyl-trimethoxysilane (silica: 15% by weight) The weight of silica nanoparticles and the like indicated in brackets |  |  |  |  |  |  |  |
|  |  | (A) + (B) + (C) + (D) (parts by weight) | 100 | 100 | 100 | 86.4 | 86.4 | 86.4 | 86.3 |
|  |  | (A) + (B) + (C) + (D) + (E) + (F) + (G) + (H) (parts by weight) | 110.8 | 110.8 | 109 | 97.2 | 94.2 | 95.7 | 92.6 |
| Evaluation | [1] Viscosity (mPa·S) |  | 11 | 15 | 16 | 20 | 16 | 16 | 16 |
|  | [2] Storage stability |  | A | A | A | A | A | A | A |
|  | [3] Film forming properties (spin coat smoothness) |  | A | A | B | A | A | A | A |
|  | [4] Curability |  | AA | AA | AA | AA | AA | AA | AA |

TABLE 2

|  |  |  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 |
|---|---|---|---|---|---|---|---|---|---|---|---|
| Composition | Component (A) | Trimethylolpropanetriglycidyl ether |  |  |  | 13.6 | 13.6 | 13.6 | 60 |  |  |
|  | Aromatic diglycidyl ether | Bisphenol A diglycidyl ether | 13.6 |  |  |  |  |  |  |  |  |
|  | Alicyclic epoxy compound | 2-(3,4-epoxycyclohexyl) carboxylate |  | 13.6 |  |  |  |  |  |  |  |
|  | Component (B) | OX-SQ-H (Toagosei Co., Ltd.) | 18.2 | 18.2 | 18.2 |  | 18.2 | 18.2 | 10 |  |  |
|  | Component (C) | M Silicate 51 | 4.5 | 4.5 | 4.5 | 4.5 |  | 4.5 | 1.7 |  |  |
|  | Component (D) | 3-Glycidoxypropyltrimethoxysilane | 50.0 | 50.0 | 50.0 | 50.0 | 50.0 |  | 20 |  |  |
|  |  | Partial condensate of 3-glycidoxypropyltrimethoxysilane | 13.7 | 13.7 | 13.7 | 13.7 | 13.7 |  | 5.0 |  |  |
|  | Component (E) | SP-150 (product of Asahi Denka Co., Ltd.) | 4.5 | 4.5 | 3.2 | 3.2 | 4.0 | 1.5 | 4.5 |  |  |
|  | Component (F) | 2,2',4,4'-Tetrahydroxy-benzophenone (2-hydroxybenzophenone-based ultraviolet absorbor) | 3.0 | 3.0 | 2.5 | 2.5 | 3.0 | 1.0 | 3.0 |  |  |
|  |  | TINUVIN 400 (triazine-based ultraviolet absorbor) | 0.75 | 0.75 | 0.6 | 0.6 | 0.75 | 0.25 | 0.75 |  |  |

TABLE 2-continued

|  |  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 |
|---|---|---|---|---|---|---|---|---|---|---|
|  | TINUVIN 1130 (benzotriazole-based ultraviolet absorbor) | 0.75 | 0.75 | 0.6 | 0.6 | 0.75 | 0.25 | 0.75 |  |  |
| Component (G) | OX-SQ-SI20(product of Toagosei Co., Ltd.) | 1.8 | 1.8 | 1.5 | 1.5 | 1.8 | 0.6 | 1.8 |  |  |
|  | (A) + (B) + (C) + (D) (parts by weight) | 100 | 100 | 86.4 | 81.8 | 95.5 | 36.3 | 96.7 |  |  |
|  | (A) + (B) + (C) + (D) + (E) + (F) + (G) (parts by weight) | 110.8 | 110.8 | 94.8 | 90.2 | 105.8 | 39.9 | 107.5 |  |  |
| Evaluation | [1] Viscosity (mPa · S) | 20 | 22 | 30 | 12 | 32 | 2800 | 35 | 112 | 52 |
|  | [2] Storage stability | A | A | A | A | A | A | A | A | A |
|  | [3] Film forming properties (spin coat smoothness) | B | B | A | A | A | C | A | C | A |
|  | [4] Curability | AA | AA | AA | AA | AA | A | A | A | C |

TABLE 3

| | Evaluation [5] Adhesion | | | |
|---|---|---|---|---|
| | Prep. Ex. 1 | Prep. Ex. 2 | Prep. Ex. 3 | Prep. Ex. 4 |
| Example 1 | AA | AA | AA | AA |
| Example 2 | AA | AA | AA | AA |
| Example 3 | AA | AA | AA | AA |
| Example 4 | AA | AA | AA | AA |
| Example 5 | AA | AA | AA | AA |
| Example 6 | AA | AA | AA | AA |
| Example 7 | AA | AA | AA | AA |
| Example 8 | AA | AA | AA | AA |
| Example 9 | AA | AA | AA | AA |
| Example 10 | AA | AA | AA | AA |
| Example 11 | AA | AA | AA | AA |
| Example 12 | AA | AA | AA | AA |
| Example 13 | AA | AA | AA | AA |
| Example 14 | AA | AA | AA | AA |
| Example 15 | AA | AA | AA | AA |
| Comp. Ex. 1 | AA | AA | AA | AA |
| Comp. Ex. 2 | B | B | B | B |
| Comp. Ex. 3 | B | B | C | C |
| Comp. Ex. 4 | A | B | B | B |
| Comp. Ex. 5 | B | B | B | B |
| Comp. Ex. 6 | A | A | B | B |
| Comp. Ex. 7 | AA | AA | AA | AA |
| Comp. Ex. 8 | C | C | C | C |
| Comp. Ex. 9 | C | C | C | C |

TABLE 4

| | Evaluation | | | | |
|---|---|---|---|---|---|
| | [6] Scratch resistance | [7] Transmittance | [8] Weather resistance | | [9] Hot water resistance |
| | | | Carbon arc | Xenon | |
| Example 1 | A | A | AA | AA | A |
| Example 2 | AA | A | AA | AA | A |
| Example 3 | A | A | AA | AA | A |
| Example 4 | AA | A | AA | AA | A |
| Example 5 | A | A | AA | AA | A |
| Example 6 | A | A | AA | AA | A |
| Example 7 | A | A | AA | AA | A |
| Example 8 | A | A | AA | AA | A |
| Example 9 | A | A | AA | AA | A |
| Example 10 | A | A | AA | AA | A |
| Example 11 | A | A | AA | AA | A |
| Example 12 | A | A | AA | AA | A |
| Example 13 | A | A | A | AA | A |
| Example 14 | A | A | A | AA | A |
| Example 15 | A | A | A | A | A |
| Comp. Ex. 1 | D | A | B | A | A |
| Comp. Ex. 2 | C | A | Not performed | Not performed | A |
| Comp. Ex. 3 | A | A | Not performed | Not performed | A |
| Comp. Ex. 4 | A | C | Not performed | Not performed | B (swelling) |
| Comp. Ex. 5 | A | A | Not performed | Not performed | A |
| Comp. Ex. 6 | B | B | B | B | A |
| Comp. Ex. 7 | C | A | A | A | B (swelling) |
| Comp. Ex. 8 | B | A | Not performed | Not performed | A |
| Comp. Ex. 9 | D | A | Not performed | Not performed | A |

Figure 5:
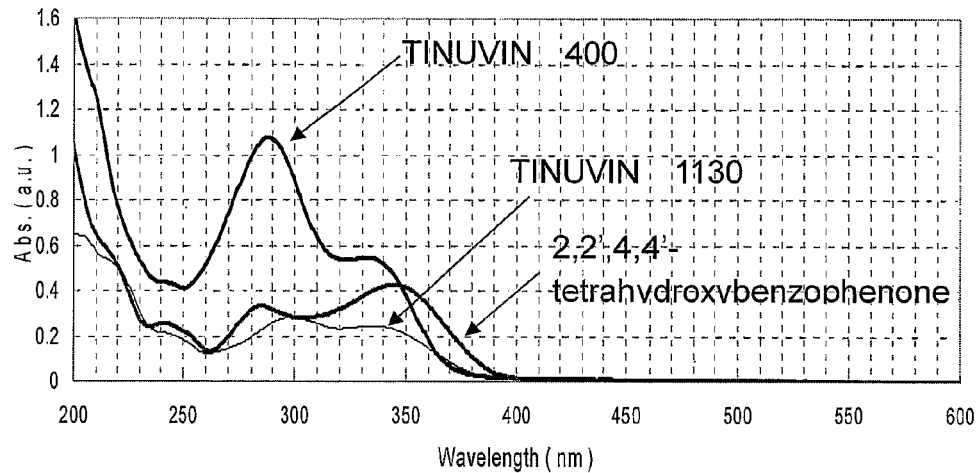
FIG. 5 shows the respective ultraviolet absorption spectra of 2,2',4,4'-tetrahydroxybenzophenone, TINUVIN 400 (Ciba Specialty Chemicals, Inc.), and TINUVIN 1130 (Ciba Specialty Chemicals, Inc.).
Figure 6:
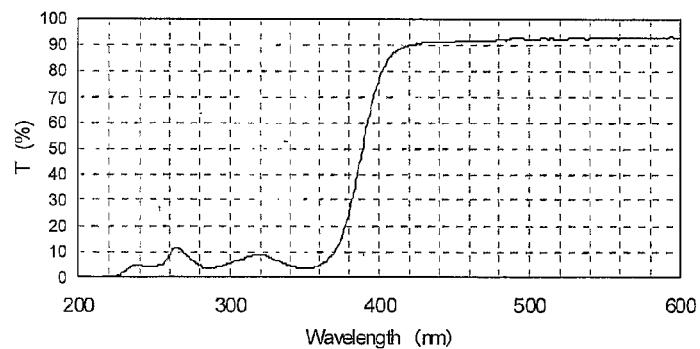
FIG. 6 shows the light transmittance of the hard coating composition prepared in Example 1.
Figure 7:
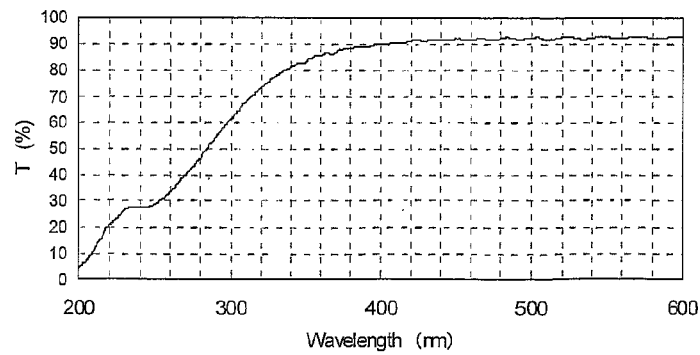
FIG. 7 shows the light transmittance of the hard coating composition prepared in Comparative Example 1.

If determined to be poor in the Adhesion test [5], Weather resistance test [8] was not performed If determined to be poor in the Adhesion test [5], Weather resistance test [8] was not performed For the samples of Examples 1 to 15, good results were obtained for the evaluation of the items [1] to [9]. In Example 2 and 4 where a closed cage-shaped-like silsesquioxane: octa [2-(butoxymethyl)oxirane-dimethylsiloxy]-silsesquioxane was used as a part of the silsesquioxane component, an improvement of scratch resistance could be seen. It is assumed that the silsesquioxane of a closed cage-shaped-like structure had an effective action on the improvement of scratch resistance. The hard coating agent prepared in Example 1 was applied on quartz glass, and the light transmittance thereof was measured. The measurement results are plotted in FIG. 4. The transmittance of visible light of 400 nm or longer was 90% or greater, while ultraviolet light of 350 nm or shorter was mostly intercepted. As a result of not adding 2,2',4,4'-tetrahydroxybenzophenone, which is a 2-hydroxybenzophenone-based ultraviolet absorber, in Examples 13 and 14, when a carbon arc lamp was used in weather resistance test, peeling-off of the films was observed to a small extent, but not to an extent to cause any problems. In the case of Example 15, slight peeling off of the film was observed even when a xenon lamp was used, as compared with the cases of Examples 1 to 14 where ultraviolet absorbers were added. However, the evaluation of the weather resistance test resulted in A, not having any problem. The light transmittance was also measured in Example 15, likewise in Example 1. The measurement results are presented in FIG. 5. It is contemplated that since ultraviolet rays of 350 nm or shorter are not obstructed, photodegradation of thiourethane resins proceeded, and the adhesion was decreased. In the Comparative Example 1, bisphenol A diglycidyl ether was used as an aromatic diglycidyl ether replacing the component (A), and as a result, the resulting film showed insufficient scratch resistance. In the Comparative Example 2,2-(3,4-epoxycyclohexyl) carboxylate was used as an alicyclic epoxy compound replacing the component (A), and as a result, the film showed insufficient adhesion and scratch resistance. In the Comparative Example 3, the component (A) was not added, and as a result, the resulting film showed insufficient adhesion. In the Comparative Example 4, the component (B) was not added, and as a result, the resulting film showed clouding with insufficient transparency, and also insufficient water resistance. In the Comparative Example 5, the component (C) was not added, and as a result, the resulting film showed slightly insufficient adhesion. In the Comparative Example 6, the component (D) was not added, and as a result, the composition had high viscosity, poor film forming properties, and the resulting film showed insufficient scratch resistance. In the Comparative Example 7, since the proportion of the component (A) was high, while the proportions of the components (B) to (D) were low, the resulting film showed insufficient scratch resistance. The acrylic coating composition of the Comparative Example 8 showed insufficient adhesion and poor curability, and the resulting film showed slightly insufficient scratch resistance. Also, the composition's high viscosity led to poor film forming properties. The acrylic coating agent of the Comparative Example 9 had a lower viscosity than the coating composition of the Comparative Example 8, and thus, the film forming properties were good. However, the coating agent showed remarkably poor curability, and the resulting film showed remarkably poor scratch resistance and adhesion.

Industrial Applicability

The composition of the invention includes a poly(methyl) glycidyl ether compound, a silsesquioxane compound containing a cationic polymerizable group, a silicate compound, a silane compound or a partial condensated compound thereof, and a cationic photopolymerization initiator, as the essential components. Since the composition can form a coat layer having excellent scratch resistance when cured with ultraviolet radiation, the composition is useful for the use in a coating agent and the optical material field, specifically for the use in preventing reflection in the hardcoat of spectacle lenses, plasma displays, liquid crystal displays, EL displays and the like, for the use in the optical members for reading high density optical recording media, optical filters and the like, and for the use in a surface coating agent for improving the design ability of plastic materials, metallic materials, ceramic materials, glass materials and the like.

In particular, since the composition has excellent scratch resistance and adhesion to be used as a hard coating agent for the surfaces of thiourethane resins and thioepoxy resins, the composition can be widely utilized as a hard coating agent for spectacle lenses, camera lenses, pickup lenses for optical recording and regenerating devices, and the like.

The invention claimed is:

1. A hardcoat composition comprising at least the following components (A) to (E):

Component (A): a poly(methyl)glycidyl ether compound represented by Formula (1):

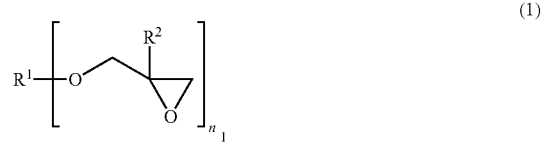

wherein $R^1$ is a chain aliphatic residue or a chain aliphatic polyether residue which may contain a hydroxyl group; $R^2$ is hydrogen or a methyl group; and $n_1$ represents an integer of 2 or larger;

Component (B): a silsesquioxane compound containing a cationic polymerizable group;

Component (C): a silicate compound represented by Formula (2):

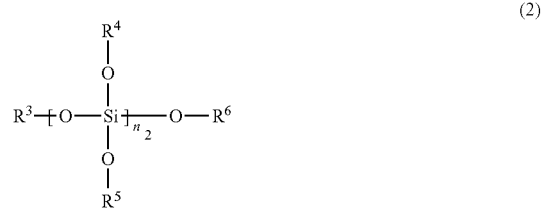

wherein $R^3$ to $R^6$ are each independently an organic group having a cationic polymerizable group, hydrogen or an alkyl group; and $n_2$ represents an integer from 2 to 10;

Component (D): a silane compound represented by Formula (3) or a partial condensed compound of the silane compound, or a mixture of such compounds:

wherein R⁷ is an organic group having a cationic polymerizable group; R⁸ and R⁹ are each independently hydrogen or an alkyl group; and n₃ represents an integer from 1 to 3;

Compound (E): a cationic photopolymerization initiator,
wherein the composition comprises 5 to 40 parts by weight of the component (A), 60 to 95 parts by weight of the total of the components (B), (C), and (D), and 0.1 to 10 parts by weight of the component (E), each based on 100 parts by weight of the total of the components (A) to (D),
said composition further comprising at least one ultraviolet absorber as component (F), wherein the content of the component (F) is 0.1 to 10 parts by weight based on 100 parts by weight of the total of the components (A) to (D) and wherein the component (F) comprises at least one or more ultraviolet absorber having a maximum absorption wavelength of 320 to 400 nm (UV-A),
wherein the component (A) is selected from the group consisting of ethylene glycol (methyl) diglycidyl ether, triethylene glycol di(methyl)glycidyl ether, tetraethylene glycol di(methyl)glycidyl ether, polyethylene glycol di(methyl)glycidyl ether, glycerin di(methyl)glycidyl ether, 1,4-butanediol di(methyl)glycidyl ether, 1,6-hexanediol di(methyl)glycidyl ether, neopentyl glycol (methyl)glycidyl ether, glycerin tri(methyl)glycidyl ether, trimethylolpropane tri(methyl)glycidyl ether, pentaerythritol tri(methyl)glycidyl ether, pentaerythritol tetra(methyl)glycidyl ether, dipentaerythritol hexa(methyl)glycidyl ether, dipentaerylthritol penta(methyl)glycidyl ether, dipentaerythritol tetra(methyl)glycidyl ether or carbitol polyglycidyl ether,
wherein the component (B) comprises a closed type cage-shaped-like silsesquioxane represented by Formula (6) or a partially open type cage-shaped-like silsesquioxane represented by Formula (7), each having at least one or more cationic polymerizable group:

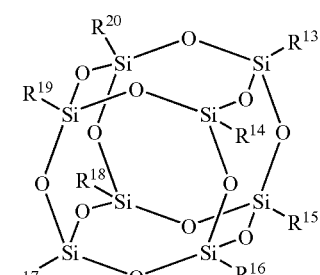

(6)

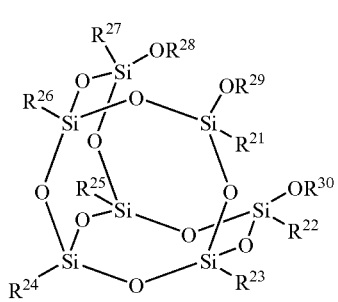

(7)

wherein R¹³ to R³⁰ each independently represents a cationic polymerizable group, hydrogen, an alkyl group, a cyclopentyl group, or a cyclohexyl group,
wherein the cationic polymerizable group in Formulae (6) and (7) is represented by Formula (30), (31), (32) or (33):

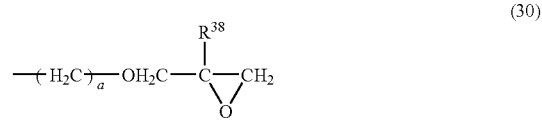

(30)

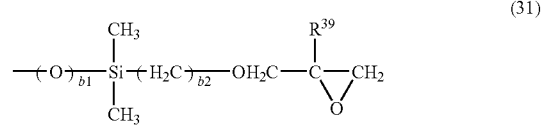

(31)

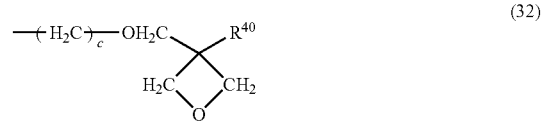

(32)

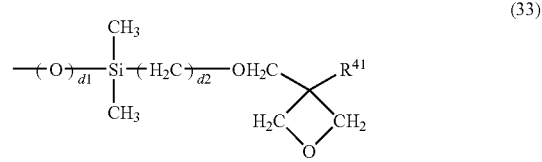

(33)

wherein R³⁸ and R³⁹ each independently represent hydrogen or a methyl group; R⁴⁰ and R⁴¹ each independently represent a methyl group or an ethyl group; a, b₂, c, d₂ each independently represent an integer from 1 to 10; and b₁ and d₁ each independently represent 0 or 1.

2. The hardcoat composition according to claim 1,
wherein the ultraviolet absorber having a maximum absorption wavelength at 320 to 400 mu (UV-A) is a 2-hydroxybenzophenone-based ultraviolet absorber represented by Formula (8):

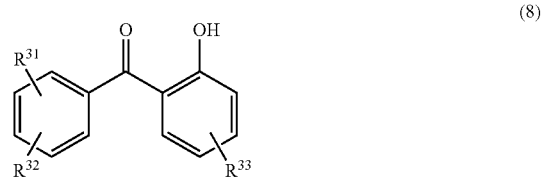

(8)

wherein R³¹ to R³³ each independently represent a hydroxyl group, a hydrogen atom, an alkyl group or an alkoxy group.

3. The hardcoat composition according to claim 1,
which comprises at least one or more of a triazine-based ultraviolet absorber and/or a benzotriazole-based ultraviolet absorber as the ultraviolet absorber having a maximum absorption wavelength of 320 to 400 nm (UV-A).

4. The hardcoat composition according to claim 1,
which uses at least a 2-hydroxybenzophenone-based ultraviolet absorber in combination with a triazine-based ultraviolet absorber and/or a benzotriazole-based ultraviolet absorber, as the ultraviolet absorber having a maximum absorption wavelength of 320 to 400 nm (UV-A).

5. A hardcoat composition comprising at least the following components (A) to (E):

Component (A): a poly(methyl)glycidyl ether compound represented by Formula (1):

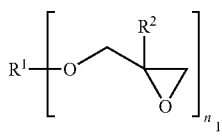

(1)

wherein $R^1$ is a chain aliphatic residue or a chain aliphatic polyether residue which may contain a hydroxyl group; $R^2$ is hydrogen or a methyl group; and $n_1$ represents an integer of 2 or larger;

Component (B): a silsesquioxane compound containing a cationic polymerizable group;

Component (C): a silicate compound represented by Formula (2):

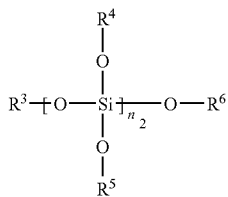

(2)

wherein $R^3$ to $R^6$ are each independently an organic group having a cationic polymerizable group, hydrogen or an alkyl group; and $n_2$ represents an integer from 2 to 10;

Component (D): a silane compound represented by Formula (3) or a partial condensed compound of the silane compound, or a mixture of such compounds:

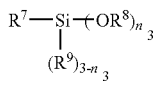

(3)

wherein $R^7$ is an organic group having a cationic polymerizable group; $R^8$ and $R^9$ are each independently hydrogen or an alkyl group; and $n_3$ represents an integer from 1 to 3;

Compound (E): a cationic photopolymerization initiator, wherein the composition comprises 5 to 40 parts by weight of the component (A), 60 to 95 parts by weight of the total of the components (B), (C), and (D), and 0.1 to 10 parts by weight of the component (E), each based on 100 parts by weight of the total of the components (A) to (D), said composition further comprising silica nanoparticles as component (H), in an amount of 10.0 parts by weight or less based on 100 parts by weight of the total of components (A) to (D), wherein the component (A) is selected from the group consisting of ethylene glycol (methyl) diglycidyl ether, triethylene glycol di(methyl)glycidyl ether, tetraethylene glycol di(methyl)glycidyl ether, polyethylene glycol di(methyl)glycidyl ether, glycerin di(methyl)glycidyl ether, 1,4-butanediol di(methyl)glycidyl ether, 1,6-hexanediol di(methyl)glycidyl ether, neopentyl glycol (methyl)glycidyl ether, glycerin tri(methyl)glycidyl ether, trimethylolpropane tri(methyl)glycidyl ether, pentaerythritol tri(methyl)glycidyl ether, pentaerythritol tetra(methyl)glycidyl ether, dipentaerythritol hexa(methyl)glycidyl ether, dipentaerylthritol penta(methyl)glycidyl ether, dipentaerythritol tetra(methyl)glycidyl ether or carbitol polyglycidyl ether, wherein the component (B) comprises a closed type cage-shaped-like silsesquioxane represented by Formula (6) or a partially open type cage-shaped-like silsesquioxane represented by Formula (7), each having at least one or more cationic polymerizable group:

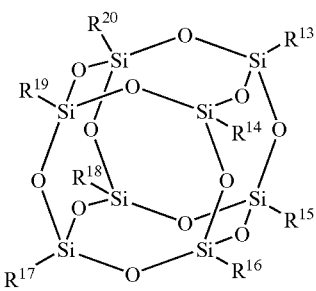

(6)

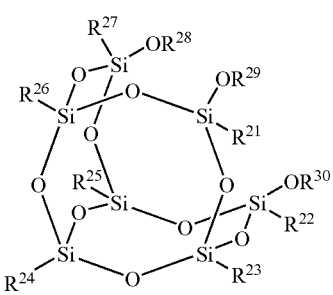

(7)

wherein $R^{13}$ to $R^{30}$ each independently represents a cationic polymerizable group, hydrogen, an alkyl group, a cyclopentyl group, or a cyclohexyl group, wherein the cationic polymerizable group in Formulae (6) and (7) is represented by Formula (30), (31), (32) or (33):

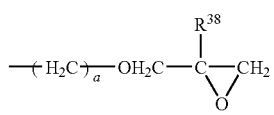

(30)

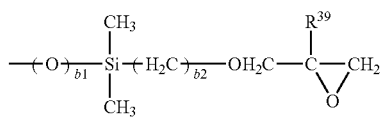

(31)

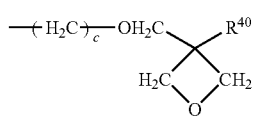

(32)

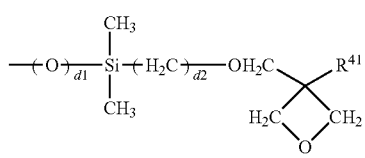

(33)

wherein $R^{38}$ and $R^{39}$ each independently represent hydrogen or a methyl group; $R^{40}$ and $R^{41}$ each independently represent a methyl group or an ethyl group; a, $b_2$, c, $d_2$ each independently represent an integer from 1 to 10; and $b_1$ and d, each independently represent 0 or 1.

6. A molded article having a cured film formed by applying a hardcoat composition on the surface of the molded article, and then curing the composition, said composition comprising at least the following components (A) to (E):

Component (A): a poly(methyl)glycidyl ether compound represented by Formula (1):

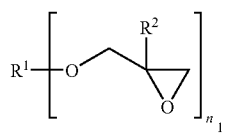
(1)

wherein $R^1$ is a chain aliphatic residue or a chain aliphatic polyether residue which may contain a hydroxyl group; $R^2$ is hydrogen or a methyl group; and $n_1$ represents an integer of 2 or larger;

Component (B): a silsesquioxane compound containing a cationic polymerizable group;

Component (C): a silicate compound represented by Formula (2):

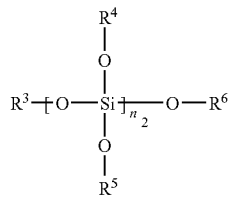
(2)

wherein $R^3$ to $R^6$ are each independently an organic group having a cationic polymerizable group, hydrogen or an alkyl group; and $n_2$ represents an integer from 2 to 10;

Component (D): a silane compound represented by Formula (3) or a partial condensed compound of the silane compound, or a mixture of such compounds:

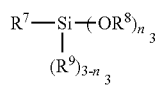
(3)

wherein $R^7$ is an organic group having a cationic polymerizable group; $R^8$ and $R^9$ are each independently hydrogen or an alkyl group; and $n_3$ represents an integer from 1 to 3;

Compound (E): a cationic photopolymerization initiator, wherein the composition comprises 5 to 40 parts by weight of the component (A), 60 to 95 parts by weight of the total of the components (B), (C), and (D), and 0.1 to 10 parts by weight of the component (E), each based on 100 parts by weight of the total of the components (A) to (D), wherein the molded article is formed of at least one selected from a thiourethane resin or a thioepoxy resin.

7. A molded article having a cured film formed by applying the hardcoat composition according to claim 1 on the surface of the molded article, and then curing the composition.

8. A molded article having a cured film formed by applying a hardcoat composition on the surface of the molded article, and then curing the composition, said composition comprising at least the following components (A) to (E):

Component (A): a poly(methyl)glycidyl ether compound represented by Formula (1):

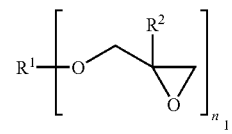
(1)

wherein $R^1$ is a chain aliphatic residue or a chain aliphatic polyether residue which may contain a hydroxyl group; $R^2$ is hydrogen or a methyl group; and $n_1$ represents an integer of 2 or larger;

Component (B): a silsesquioxane compound containing a cationic polymerizable group;

Component (C): a silicate compound represented by Formula (2):

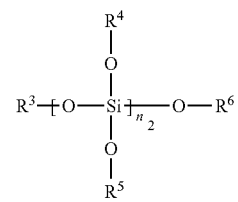
(2)

wherein $R^3$ to $R^6$ are each independently an organic group having a cationic polymerizable group, hydrogen or an alkyl group; and $n_2$ represents an integer from 2 to 10;

Component (D): a silane compound represented by Formula (3) or a partial condensed compound of the silane compound, or a mixture of such compounds:

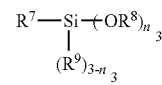
(3)

wherein $R^7$ is an organic group having a cationic polymerizable group; $R^8$ and $R^9$ are each independently hydrogen or an alkyl group; and $n_3$ represents an integer from 1 to 3;

Compound (E): a cationic photopolymerization initiator, wherein the composition comprises 5 to 40 parts by weight of the component (A), 60 to 95 parts by weight of the total of the components (B), (C), and (D), and 0.1 to 10 parts by weight of the component (E), each based on 100 parts by weight of the total of the components (A) to (D), said composition further comprising at least one ultraviolet absorber as component (F), wherein the content of the component (F) is 0.1 to 10 parts by weight based on 100 parts by weight of the total of the components (A) to (D) and wherein the molded article is formed of at least one selected from a thiourethane resin or a thioepoxy resin.

9. The molded article according to claim 7, wherein the molded article is formed of at least one selected from a thiourethane resin or a thioepoxy resin.

10. A lens having a cured coating film which is formed by applying a hardcoat composition on the surface of the lens, and then curing the composition, said composition comprising at least the following components (A) to (E):

Component (A): a poly(methyl)glycidyl ether compound represented by Formula (1):

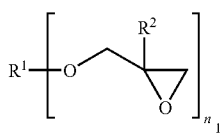

wherein $R^1$ is a chain aliphatic residue or a chain aliphatic polyether residue which may contain a hydroxyl group; $R^2$ is hydrogen or a methyl group; and $n_1$ represents an integer of 2 or larger;

Component (B): a silsesquioxane compound containing a cationic polymerizable group;

Component (C): a silicate compound represented by Formula (2):

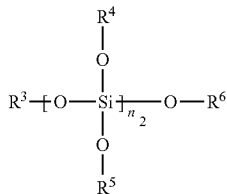

wherein $R^3$ to $R^6$ are each independently an organic group having a cationic polymerizable group, hydrogen or an alkyl group; and $n_2$ represents an integer from 2 to 10;

Component (D): a silane compound represented by Formula (3) or a partial condensed compound of the silane compound, or a mixture of such compounds:

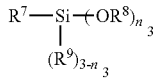

wherein $R^7$ is an organic group having a cationic polymerizable group; $R^8$ and $R^9$ are each independently hydrogen or an alkyl group; and $n_3$ represents an integer from 1 to 3;

Compound (E): a cationic photopolymerization initiator, wherein the composition comprises 5 to 40 parts by weight of the component (A), 60 to 95 parts by weight of the total of the components (B), (C), and (D), and 0.1 to 10 parts by weight of the component (E), each based on 100 parts by weight of the total of the components (A) to (D), said composition further comprising at least one ultraviolet absorber as component (F), wherein the content of the component (F) is 0.1 to 10 parts by weight based on 100 parts by weight of the total of the components (A) to (D), wherein the component (A) is selected from the group consisting of ethylene glycol (methyl) diglycidyl ether, triethylene glycol di(methyl)glycidyl ether, tetraethylene glycol di(methyl)glycidyl ether, polyethylene glycol di(methyl)glycidyl ether, glycerin di(methyl)glycidyl ether, 1,4-butanediol di(methyl)glycidyl ether, 1,6-hexanediol di(methyl)glycidyl ether, neopentyl glycol (methyl)glycidyl ether, glycerin tri(methyl)glycidyl ether, trimethylolpropane tri(methyl)glycidyl ether, pentaerythritol tri(methyl)glycidyl ether, pentaerythritol tetra(methyl)glycidyl ether, dipentaerythritol hexa(methyl)glycidyl ether, dipentaerylthritol penta(methyl)glycidyl ether, dipentaerythritol tetra(methyl)glycidyl ether or carbitol polyglycidyl ether, wherein the component (B) comprises a closed type cage-shaped-like silsesquioxane represented by Formula (6) or a partially open type cage-shaped-like silsesquioxane represented by Formula (7), each having at least one or more cationic polymerizable group:

wherein $R^{13}$ to $R^{30}$ each independently represents a cationic polymerizable group, hydrogen, an alkyl group, a cyclopentyl group, or a cyclohexyl group, wherein the cationic polymerizable group in Formulae (6) and (7) is represented by Formula (30), (31), (32) or (33):

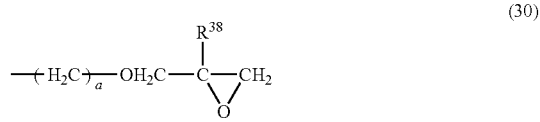

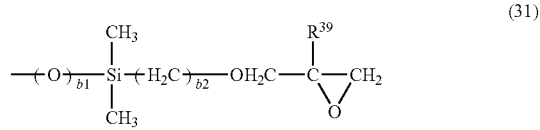

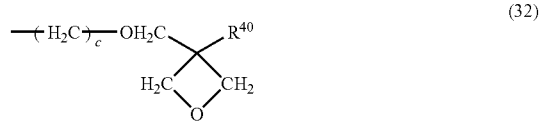

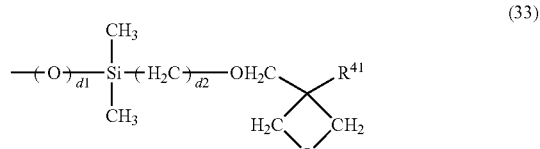

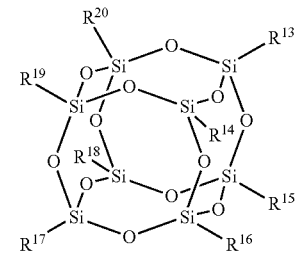

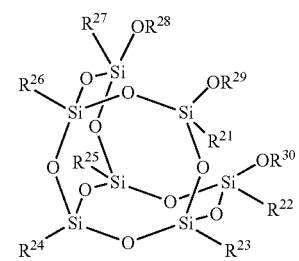

wherein $R^{38}$ and $R^{39}$ each independently represent hydrogen or a methyl group; $R^{40}$ and $R^{41}$ each independently represent a methyl group or an ethyl group; a, $b_2$, c, $d_2$ each independently represent an integer from 1 to 10; and $b_1$ and $d_1$ each independently represent 0 or 1.

11. A lens having a cured coating film which is formed by applying the hardcoat composition according to claim 5 on the surface of the lens, and then curing the composition.

* * * * *